US006955239B2

(12) United States Patent
Ueda et al.

(10) Patent No.: US 6,955,239 B2
(45) Date of Patent: Oct. 18, 2005

(54) INDUSTRIAL VEHICLE

(75) Inventors: Jyun Ueda, Osaka (JP); Norihiro Ohe, Osaka (JP); Eiichi Kikuchi, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 10/783,410

(22) Filed: Feb. 20, 2004

(65) Prior Publication Data

US 2004/0211616 A1 Oct. 28, 2004

Related U.S. Application Data

(62) Division of application No. 10/182,475, filed as application No. PCT/JP00/03890 on Jun. 14, 2000, now abandoned.

(30) Foreign Application Priority Data

| Mar. 1, 2000 | (JP) | ......................................... | 2000-55071 |
| Mar. 13, 2000 | (JP) | ......................................... | 2000-67883 |
| Mar. 14, 2000 | (JP) | ......................................... | 2000-69579 |

(51) Int. Cl.[7] ............................................. B60K 26/00
(52) U.S. Cl. ..................... 180/330; 180/326; 180/331; 180/335; 74/480 R; 74/513
(58) Field of Search ............................... 180/326, 330, 180/331, 335; 74/513, 478.5, 480 R

(56) References Cited

U.S. PATENT DOCUMENTS

| 2,593,643 | A | * | 4/1952 | Woolf ......................... 200/518 |
| 3,693,744 | A | * | 9/1972 | Horn et al. ................. 180/53.1 |
| 4,147,227 | A | * | 4/1979 | van der Lely .............. 180/322 |
| 4,450,927 | A | * | 5/1984 | Hirata et al. ............... 180/330 |
| 4,548,291 | A | * | 10/1985 | Tanaka et al. ............. 180/321 |
| 5,921,340 | A | * | 7/1999 | Abels .......................... 180/326 |
| 6,679,349 | B1 | * | 1/2004 | Pollish, Jr. .................. 180/326 |

FOREIGN PATENT DOCUMENTS

JP        7-52690      2/1995

* cited by examiner

Primary Examiner—Paul N. Dickson
Assistant Examiner—George D. Spisich
(74) Attorney, Agent, or Firm—Fildes & Outland, P.C.

(57) ABSTRACT

An industrial vehicle having a seat placed in a driver's room provided in a vehicle body to be rotatable at a predetermined angle in at least one of a clockwise direction and a counterclockwise direction with respect to a forward facing position, wherein the driver's room includes a main accelerator pedal at a position corresponding to the seat in the forward facing position and an auxiliary accelerator pedal at a position corresponding to the seat in a position rotated at a predetermined angle from the forward facing position and the main accelerator pedal is interlockable with the auxiliary accelerator pedal.

2 Claims, 34 Drawing Sheets

FIG. 13
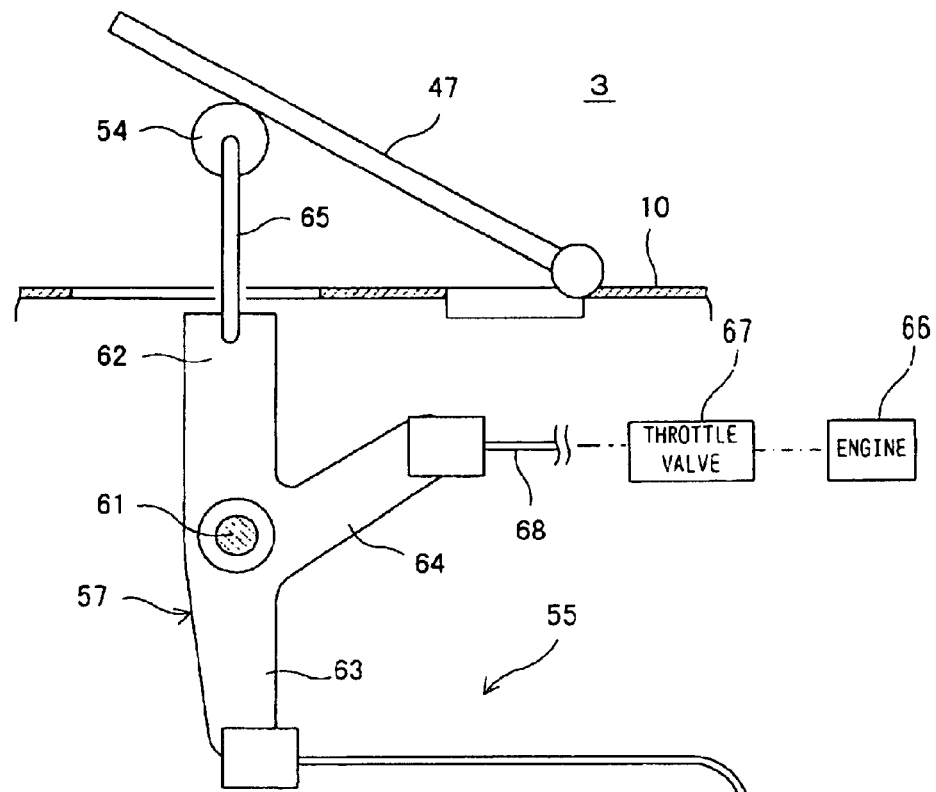
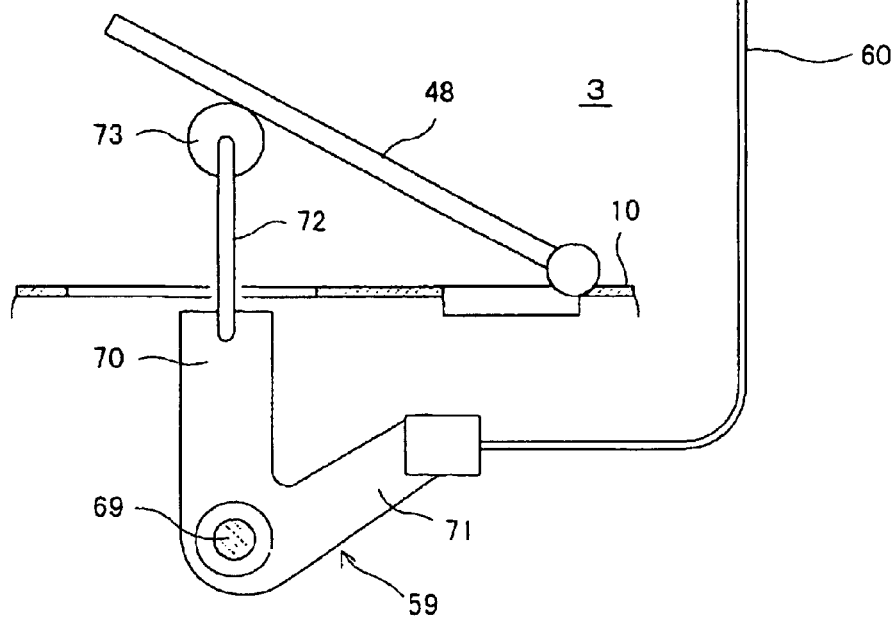

F I G. 14
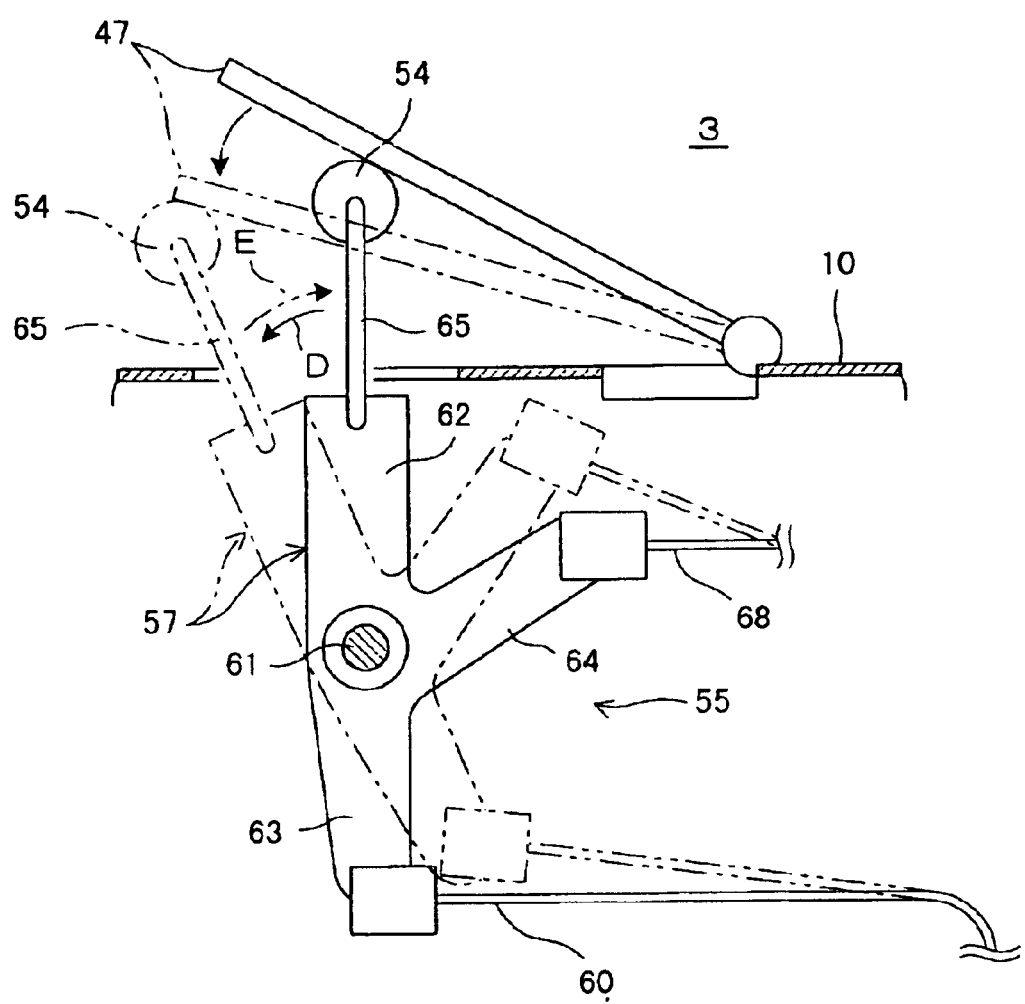

F I G. 20
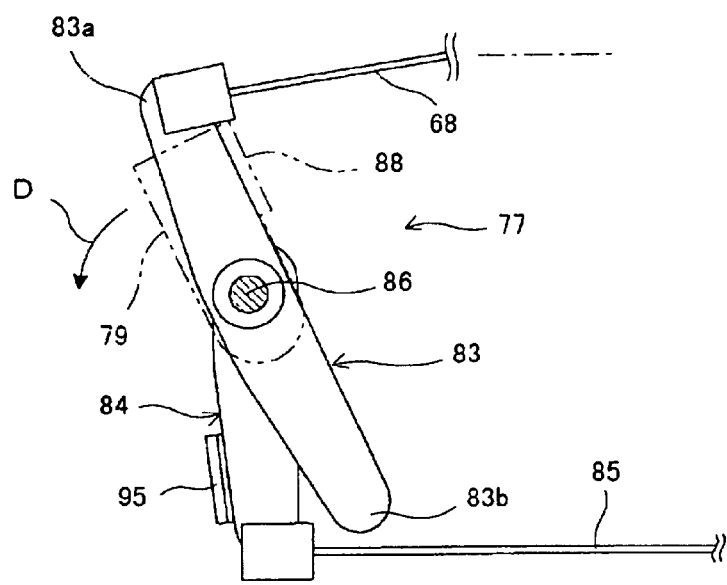
F I G. 21
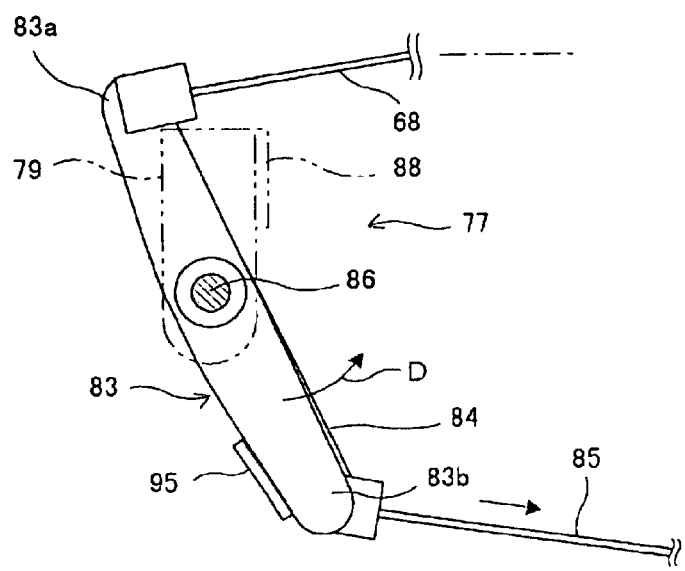

F I G. 25
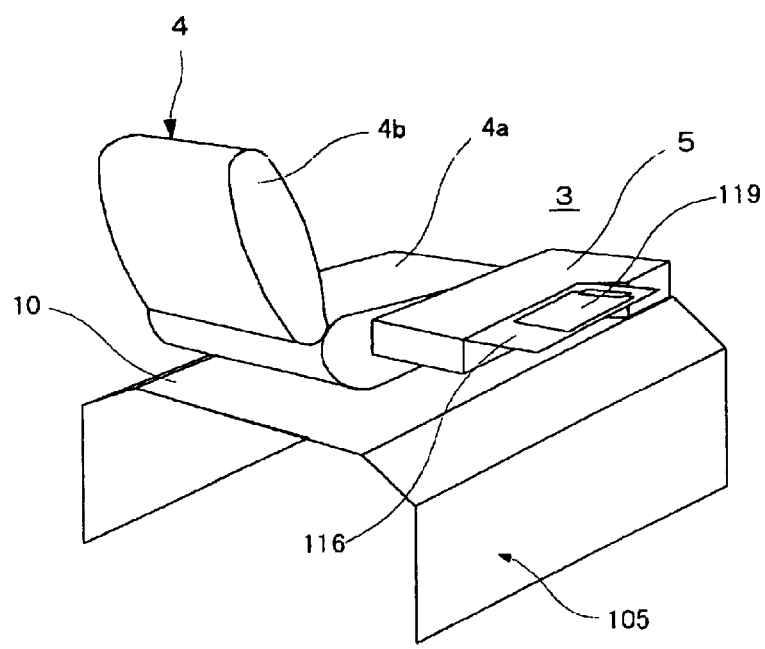

INDUSTRIAL VEHICLE

CROSS REFERENCE TO RELATED APPLICATION

This application is a division of U.S. application Ser. No. 10/182,475 filed Jul. 29, 2002 now abandoned which is a 371 of PCT/JP00/03890 filed Jun. 14, 2000 which claims priority from Japanese application nos. 200055071, filed Mar. 1, 2000; 200067883, filed Mar. 13, 2000; and 200069579, filed Mar. 14, 2000.

TECHNICAL FIELD

The present invention relates to an industrial vehicle running forward and backward, such as, for example, a fork lift.

BACKGROUND ART

Conventionally, in fork lifts, operators sitting on a seat perform operations while running backward the fork lift in a backward-facing driving posture in many cases, but since the seat is fixed to face forward, during backward running the operators have to drive the fork lift in an unnatural posture with the upper part of their body twisted at nearly 180 degrees backward, which increases operators' fatigue and makes it difficult to secure the rear view. In addition, when they get on and off from one of right and left sides of the seat, they get on and off with less ease.

As the countermeasures against the above, as shown in FIG. 32 to FIG. 34, there is one in which a seat 141 of a fork lift 140 is constructed to be rotatable at a predetermined angle in clockwise and counterclockwise directions with respect to a forward facing position A.

According to the above, when running the fork lift 140 forward, an operator 146 sits on the seat 141 and drives it facing forward while the seat 141 is in the forward facing position A, as shown in FIG. 32. When running the fork lift 140 backward, the seat 141 is rotated to a clockwise position R that is rotated at about 45 degrees to the right from the forward facing position A, as shown in FIG. 33, whereby the operator 146 is comfortable in the rear facing posture, and fatigue is relieved and securing of the rear view is facilitated. Further, as shown in FIG. 34, the seat 141 is rotated to a counterclockwise position L that is rotated at about 35 degrees to the left from the forward facing position A, whereby the operator can get on and off easily from the left side of the seat 141.

Further, the seat 141 described above is provided on a bonnet 142 covering an engine of the fork lift as shown in FIG. 35. Generally, a place where the bonnet 142 is provided is formed as a driver's room, and the driver's room is provided with a steering wheel and various kinds of operating levers. The operator 146 performs a cargo handling operation by operating the steering wheel and various kinds of operating levers while sitting on the seat 141.

On this occasion, the operator 146 sometimes operates the steering wheel and various kinds of operating levers while looking at a document 143 (for example, a storage and retrieval slips and the like) containing the description of the content and procedure of a cargo handling operation. For such a situation, a holder 144 for holding the above-described document 143 is provided on an outer surface of the bonnet 142 at one side of the seat 141. The operator 146 puts the document 143 in the holder 144, and performs a cargo handling operation while looking at this document 143. Since the document 143 is held on the bonnet 142 by the holder 144, the document 143 is prevented from falling off the bonnet 142.

However, according to the above-described fork lift 140 with the conventional construction, the seat 141 may suddenly rotate in clockwise and counterclockwise directions during running and the like.

An accelerator pedal 145 is provided at one position at a right side in front of the seat 141, and when the operator 146 sits on the seat 141 in the forward facing position A as shown in FIG. 32, he or she can operate the accelerator pedal 145 by his or her right foot as usual, but when he or she sits on the seat 141 in the rotated position R as shown in FIG. 33, a problem arises that it is difficult to operate the accelerator pedal 145 by the right foot. On this occasion, the operator may operate the accelerator pedal 145 with his or her left foot, but it may cause an operating error since the operator is not used to do so.

Further, as shown in FIG. 35, since the document holder 144 is provided on the bonnet 142, a position of the holder 144 is at a considerable distance downward from a position of a hand of the operator 146 sitting on the seat 141. Accordingly, when the operator attaches and detaches the document 143 to and from the holder 144 while sitting on the seat 141, the operator 146 has to manipulate the holder 144 in a posture in which the upper part of the body is bent, and thus there arises a problem that he or she has difficulty in working. In addition, since a distance (difference of elevation) between the height of the eyes of the operator sitting on the seat 141 and the holder 144 is large, there arises a problem that it is difficult to see the document 143.

Consequently, a first object of the present invention is to provide an industrial vehicle capable of preventing a seat from suddenly rotating in the clockwise and counterclockwise directions.

A second object of the invention is to provide an industrial vehicle which makes it possible to easily operate an accelerator pedal even when the seat is rotated at a predetermined angle in either clockwise or counterclockwise direction with respect to the forward facing position.

A third object of the invention is to provide an industrial vehicle in which an operator can easily attach and detach a document to and from a document holder while sitting on the seat and the operator can easily see the document attached to the document holder.

DISCLOSURE OF INVENTION

In order to attain the aforementioned first object, the present invention provides an industrial vehicle having a seat provided in a vehicle body to be rotatable in clockwise and counterclockwise directions about a vertical axis, wherein the vehicle comprises fixing means for fixing the seat in a forward facing position or a position rotated at a predetermined angle from the forward facing position, and release means for releasing the seat fixed in the position by this fixing means.

According to the above-described constitution of the present invention, when the industrial vehicle is run forward, the seat is set at the forward facing position and fixed by the fixing means. When the vehicle is run backward or getting on and off the seat is performed, the seat fixed at the forward facing position is released by the release means, then the seat is rotated up to a rotated position, and thereafter, fixed by the fixing means.

Since the seat can be fixed at the forward facing position and the rotated position respectively as described above, the seat can be prevented from accidentally rotating.

In order to attain the aforementioned second object, the present invention provides an industrial vehicle having a seat placed in a driver's room provided in a vehicle body to be rotatable at a predetermined angle in at least one of a clockwise direction and a counterclockwise direction with respect to a forward facing position, wherein the above-described driver's room is provided with a main accelerator pedal at a position corresponding to the seat in the forward facing position and an auxiliary accelerator pedal at a position corresponding to the seat in a position rotated at a predetermined angle from the forward facing position.

According to the above-described constitution of the present invention, the operator drives forward while sitting on the seat positioned to face forward when running the industrial vehicle forward. In this situation, the operator operates the main accelerator pedal.

When the industrial vehicle is run backward, the seat is rotated from the forward facing position to a rotated position, whereby the operator is comfortable in the rear facing posture, and fatigue is reduced and the rear view can be easily secured. In this situation, the operator operates the auxiliary accelerator pedal.

Since the accelerator pedals are provided at two positions and the main accelerator pedal of them is provided at the position corresponding to the seat in the forward facing position, the operator can easily operate the main accelerator pedal during forward running. Since the auxiliary accelerator pedal is provided at the position corresponding to the seat in the rotated position, the operator can also easily operate the auxiliary accelerator pedal during backward running.

In order to attain the aforementioned third object, the present invention provides an industrial vehicle having a seat provided in a driver's room of a vehicle body and an arm rest provided at one side of the above-described seat, wherein a mount for supporting a document holder is detachably provided on the above-described arm rest, and bonding means for vacuum bonding the above-described document holder is provided on the above-described mount.

According to the above-described constitution of the present invention, the document holder is placed on the mount, whereby the document holder is vacuum bonded onto the mount by the bonding means. As a result, the document holder is firmly fixed to the mount, and it never falls off the mount during an operation. By holding the document by the document holder, the operator can perform an operation, sitting on the seat while looking at the document. In this situation, since the mount is provided at the arm rest, the document holder placed on the mount is located at one side of the seat. Accordingly, the position of the document holder is near the position of the hand of the operator sitting on the seat, and therefore the operator can easily attach and detach the document to and from the document holder without bending the upper part of his or her body. A distance (difference in height) between the height of eyes of the operator sitting on the seat and the document holder is reduced, and therefore the operator can easily look at the document.

When the document holder is not used, the document holder is removed from the mount, and further the mount is removed from the arm rest, whereby the mount does not become a hindrance.

BRIEF DESCRIPTION OF DRAWINGS

FIG. 13 is an assembly diagram showing the constitution of the interlock mechanism of the accelerator pedal of the same industrial vehicle;

FIG. 14 is a diagram showing an operation of the interlock mechanism when a main accelerator pedal of the same industrial vehicle is depressed;

FIG. 20 is a diagram showing an operation of the interlock mechanism when a main accelerator pedal of the same industrial vehicle is depressed;

FIG. 21 is a diagram showing an operation of the interlock mechanism when an auxiliary accelerator pedal of the same industrial vehicle is depressed;

FIG. 25 is a perspective view of the seat of the same industrial vehicle;

BEST MODE FOR CARRYING OUT THE INVENTION

Now, the present invention will be described with reference to the attached drawings for more detailed explanation.

To begin with, a first embodiment of the present invention will be described based on FIG. 1 to FIG. 11.

Figure 8:
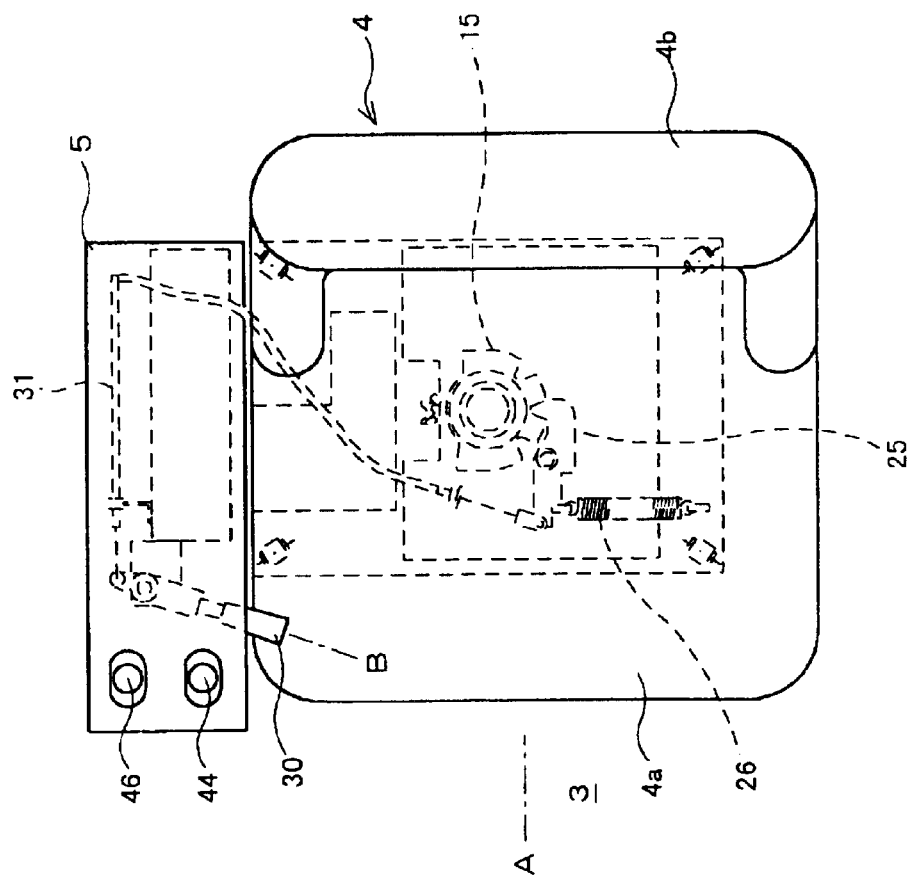
FIG. 8 is a plan view of the seat of the same industrial vehicle.
Figure 9:
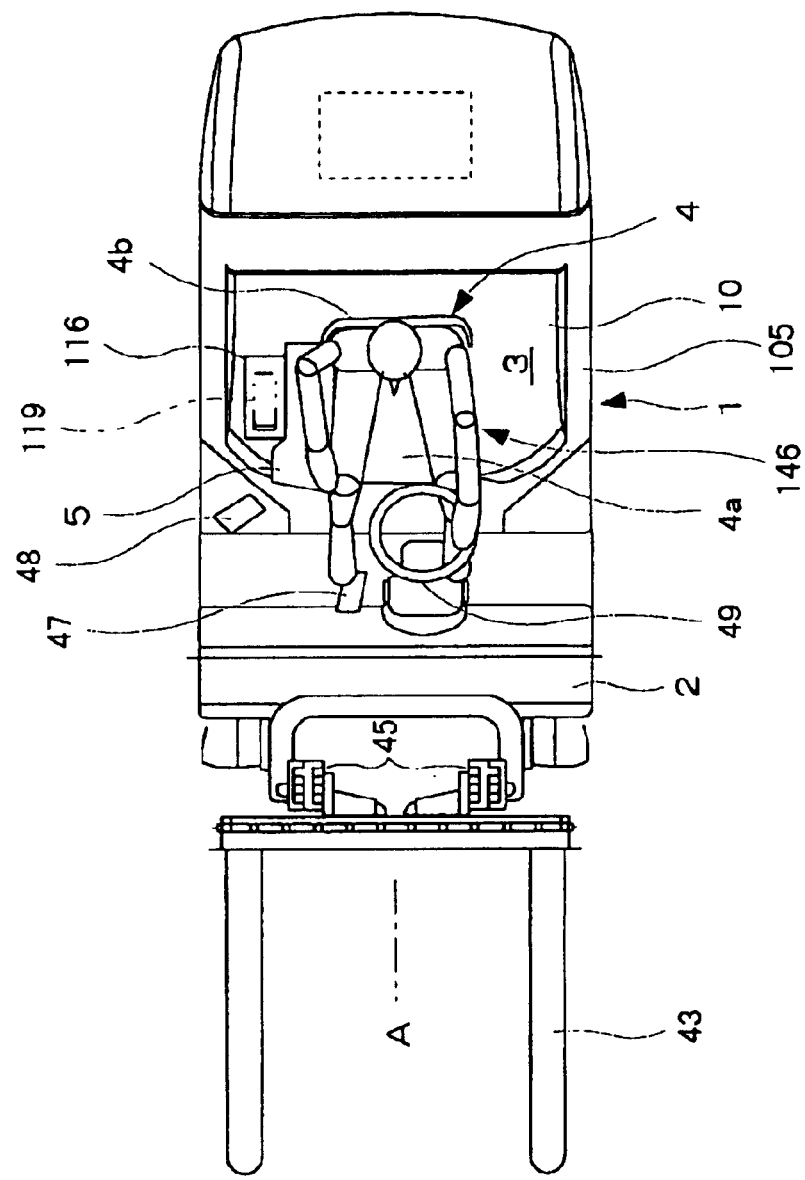
FIG. 9 is a plan view of the same industrial vehicle, showing the state in which the seat is fixed at the forward facing position.

FIG. 9 is a plan view of a fork lift 1, an example of an industrial vehicle. A driver's room 3 of a vehicle body 2 is provided with a seat 4, a steering wheel 49 and the like. As shown in FIG. 8, an arm rest 5 where an operator sitting on the seat 4 places his or her elbow is provided at a right side of the above-described seat 4. The above-described seat 4 is constituted by a seating portion 4a and a backrest 4b.

Figure 5:
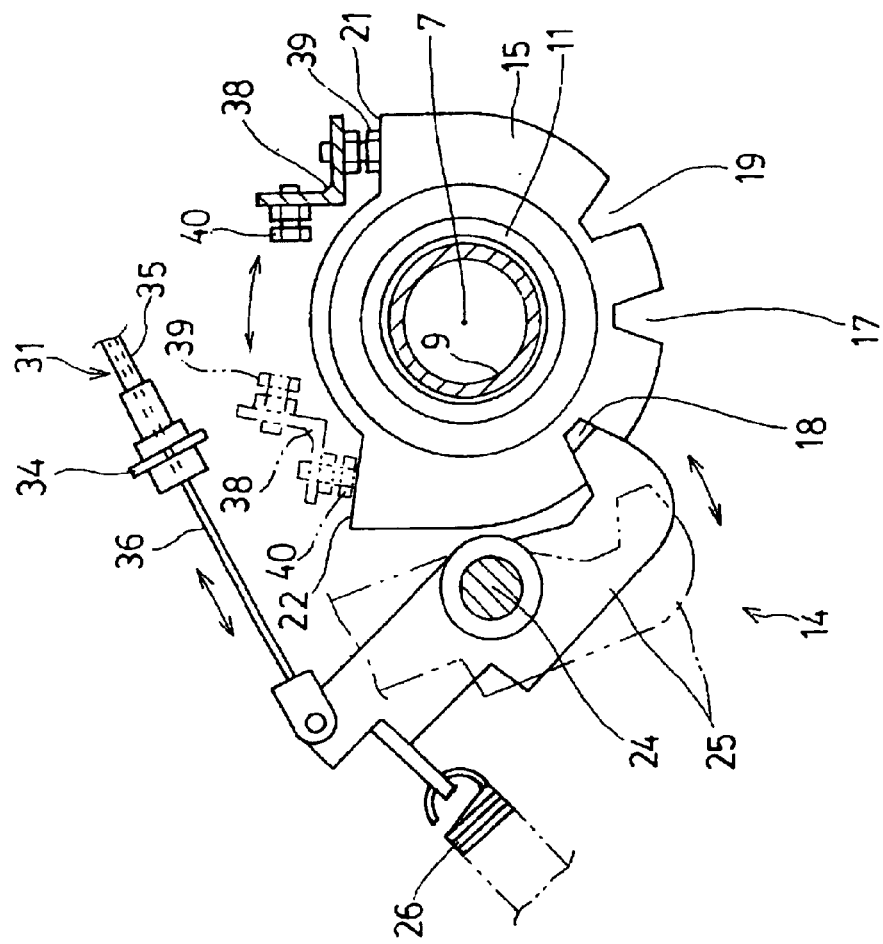
FIG. 5 is a partially enlarged plan view of the fixing means and the release means for the seat of the same industrial vehicle.
Figure 6:
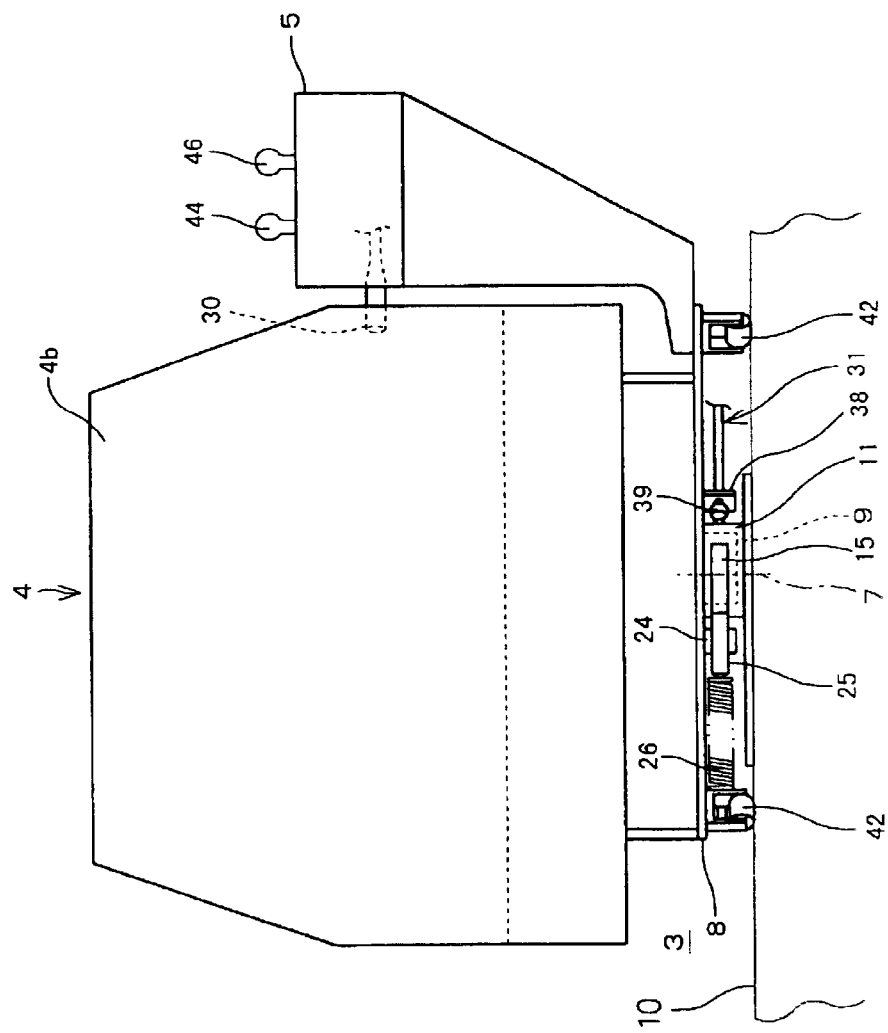
FIG. 6 is a rear view of the seat of the same industrial vehicle.
Figure 7:
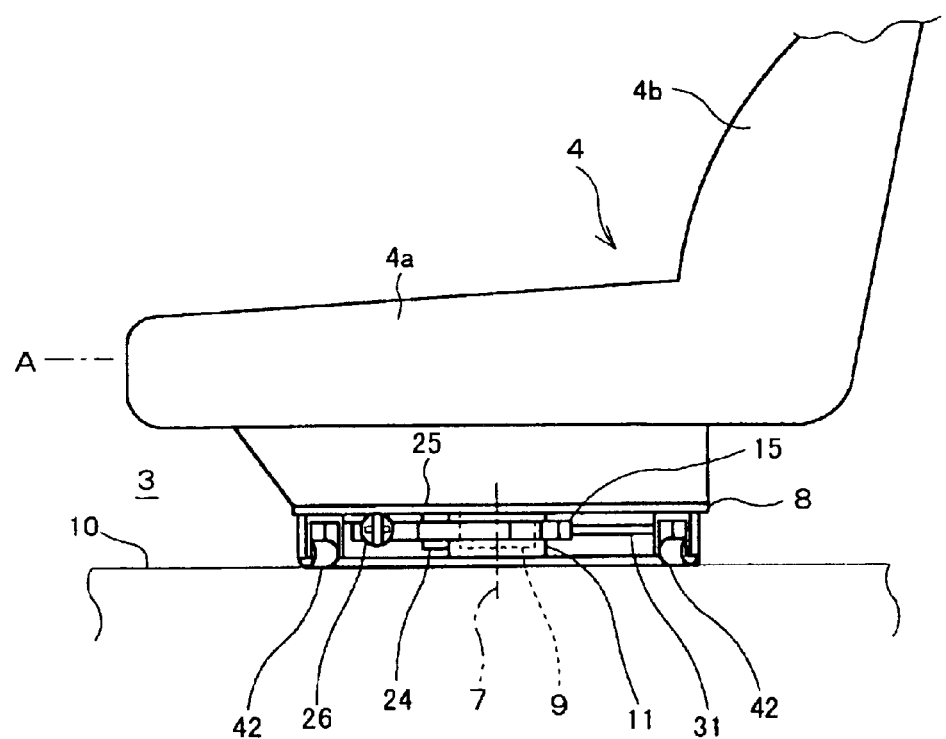
FIG. 7 is a side view of the seat of the same industrial vehicle.

As shown in FIG. 5 to FIG. 7, a lower frame 8 is provided at a lower part of the above-described seat 4, and the lower frame 8 is provided with a rotating shaft 9 in a cylindrical form projecting downward. A cylindrical fixed bearing member 11 is vertically provided on a floor 10 of the driver's room 3, and the above-described rotating shaft 9 is fitted into the fixed bearing member 11 from above to be horizontally rotatable. As a result, the above-described seat 4 is constructed to be rotatable in clockwise and counterclockwise directions about a vertical axis 7 passing through the rotating shaft 9 and the fixed bearing member 11.

The above-described seat 4 is fixed by fixing means 14 at a forward facing position A (see FIG. 9), a clockwise position R (see FIG. 10) rotated at a predetermined angle (about 45 degrees) in a clockwise direction from the forward facing position A, or a counterclockwise position L (see FIG. 11) rotated at a predetermined angle (about 35 degrees) in a counterclockwise direction from the forward facing position A. The above-described fixing means 14 is configured as will be described below.

Specifically, as shown in FIG. 1 and FIG. 5 to FIG. 7, a fixed plate 15 (an example of a fixed member) is provided on an outer circumference of the above-described fixed bearing member 11. On an outer circumference of this fixed plate 15, are formed a first notch 17 (an example of an engaging part) corresponding to the above-described forward facing position A, a second notch 18 (an example of an engaging part) corresponding to a clockwise rotated position R, a third notch 19 (an example of an engaging part) corresponding to a counterclockwise rotated position L, a first stopper surface 21 corresponding to the clockwise rotated position R and a second stopper surface 22 corresponding to the counterclockwise rotated position L.

The above-described lower frame 8 is provided with an engaging lever 25 (an example of an engaging member) horizontally swingable around a vertical shaft 24. Swing of the engaging lever 25 enables one end of the engaging lever 25 to be disengaged from the above-described first to third notches 17, 18 and 19. A coil extension spring 26 (an example of urging means) is provided between the other end of the above-described engaging lever 25 and the lower frame 8. The above-described engaging lever 25 is urged in an engaging direction by the coil extension spring 26.

Further, the above-described engaging lever 25 is disengaged from the above-described first to third notches 17, 18 and 19 by release means 28. The above-described release means 28 is constructed as follows.

Specifically, the above-described arm rest 5 is provided with an operating lever 30 for releasing, which is horizontally rotatable in a longitudinal direction around a vertical shaft 29. One end of the operating lever 30 projects to a right side of the seat 4 from the arm rest 5. The other end of the above-described operating lever 30 and the other end of the engaging lever 25 are interlocked with each other with a pull cable 31 (an example of a connecting mechanism).

The above-described pull cable 31 is constituted by a sheathing tube 35 with one end connected to a fixed frame 33 inside the arm rest 5 and the other end connected to a fixed frame 34 of the lower frame 8, and a wire 36 inserted and guided through the sheathing tube 35.

A fitting frame 38 in an angled form is vertically provided at the above-described lower frame 8, and the fitting frame 38 is provided with one stopper member 39 abutting against the above-described one stopper surface 21 in the clockwise rotated position R, and the other stopper member 40 abutting against the above-described other stopper surface 22 in the counterclockwise rotated position L.

A roller 42 is mounted at each of four corners of the above-described lower frame 8. Each of the rollers 42 is supported on the above-described floor 10 and is constructed to be rollable in a rotating direction of the seat 4.

Figure 10:
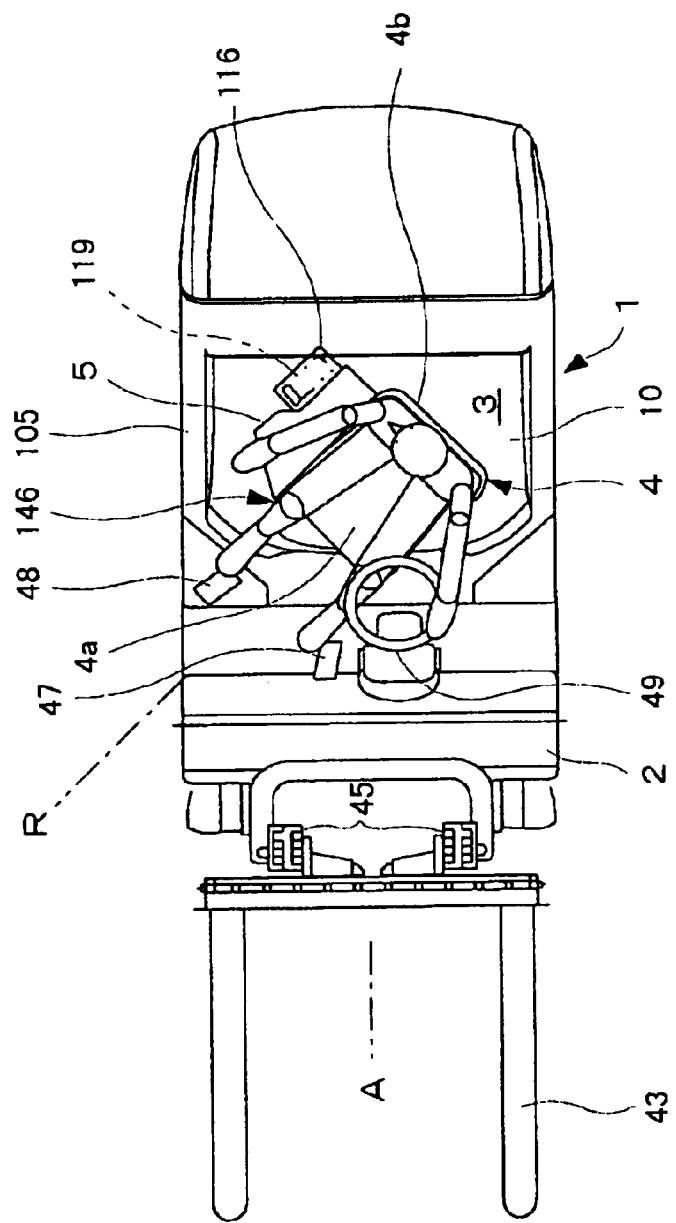
FIG. 10 is a plan view of the same industrial vehicle, showing the state in which the seat is fixed at the clockwise rotated position.

The above-described arm rest 5 is provided with an elevating lever 44 for elevating a fork 43, a tilting lever 46 for tilting a mast 45 back and forth and the like. As shown in FIG. 9 and FIG. 10, the driver's room 3 is provided with a main accelerator pedal 47 corresponding to the forward facing position A, and an auxiliary accelerator pedal 48 corresponding to the clockwise rotated position R.

An operation in the above-described first embodiment will be described below.

Figure 1:
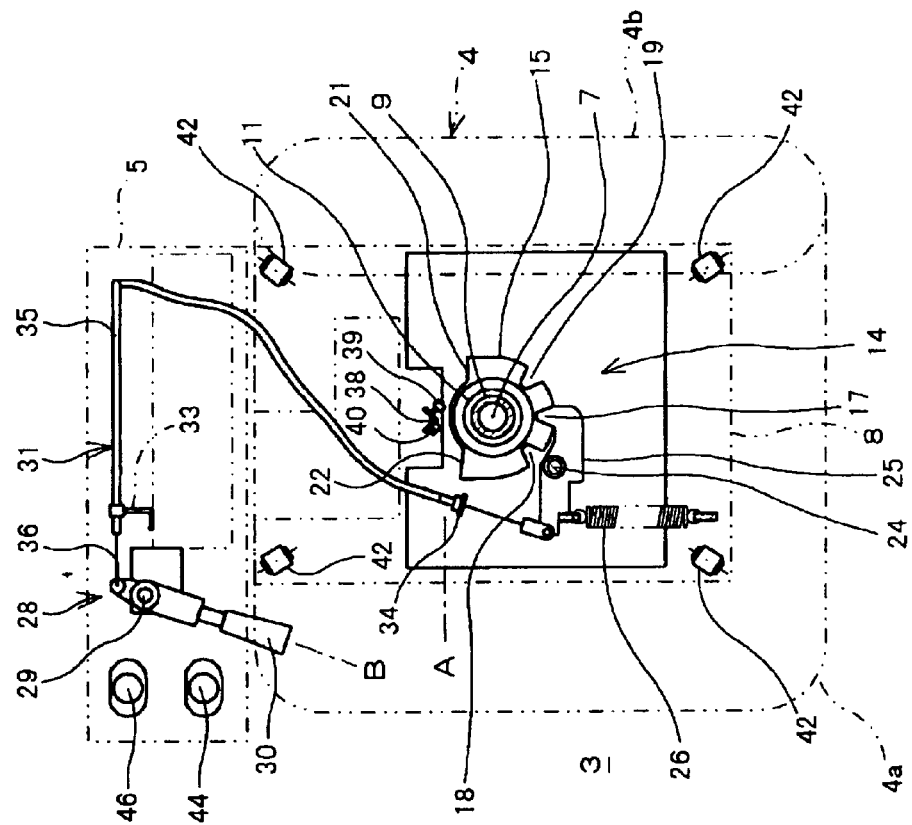
FIG. 1 is a plan view of fixing means and release means for a seat of an industrial vehicle in a first embodiment of the present invention, showing a state in which the seat is fixed at a forward facing position.

When the fork lift 1 is run forward, the seat 4 is set at the forward facing position A as shown in FIG. 9. In this situation, as shown in FIG. 1, the one end of the engaging lever 25 is engaged with the first notch 17, whereby the seat 4 is fixed at the forward facing position A. The operator 146 sitting on the seat 4 depresses the main accelerator pedal 47, whereby a speed of the fork lift 1 can be adjusted.

Figure 2:
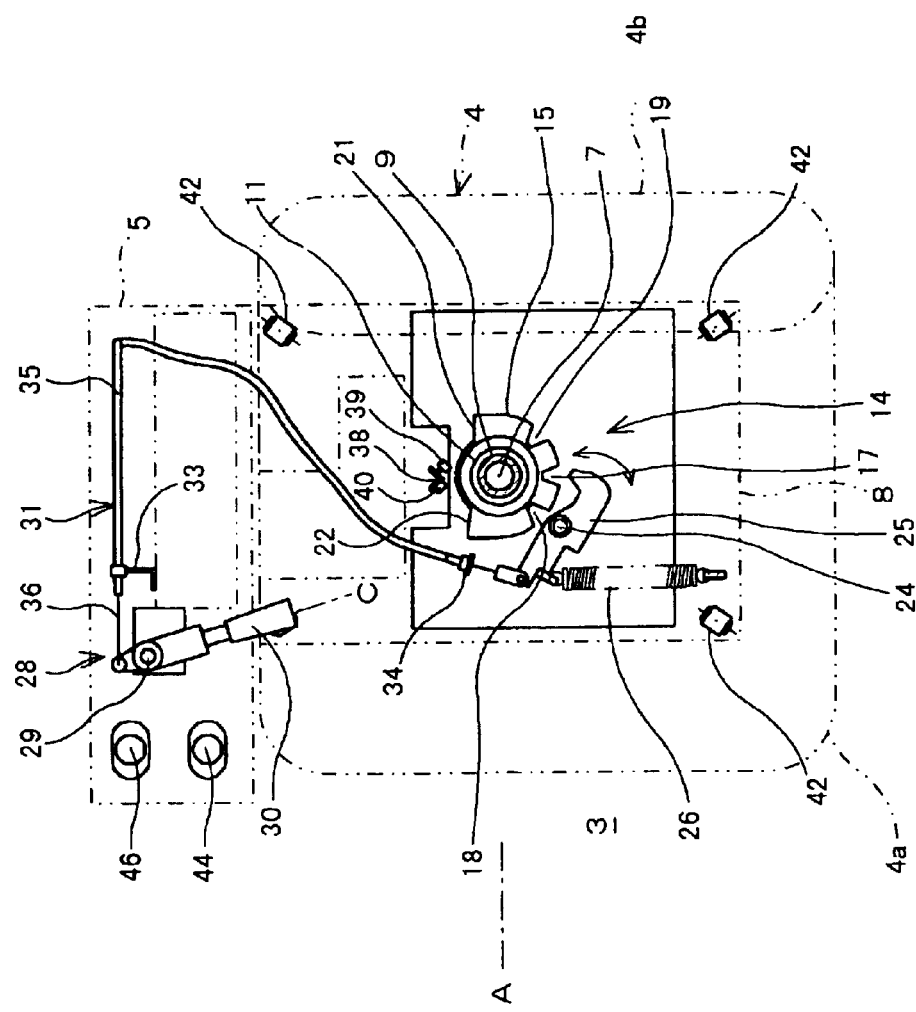
FIG. 2 is a plan view of the fixing means and release means for the seat of the same industrial vehicle, showing a state in which the fixed seat is released.

When the above-described fork lift 1 is backward, the operator 146 grips the one end of the operating lever 30, and rotates the operating lever 30 from a front switching position B to a backward switching position C, as shown in FIG. 2. As a result, the other end of the engaging lever 25 is pulled by the wire 36 of the pull cable 31, then the engaging lever 25 swings in one direction and the one end of the engaging lever 25 is disengaged from the first notch 17, whereby the seat 4 fixed in the forward facing position A is released and the seat 4 is switched into a rotatable state.

Figure 3:
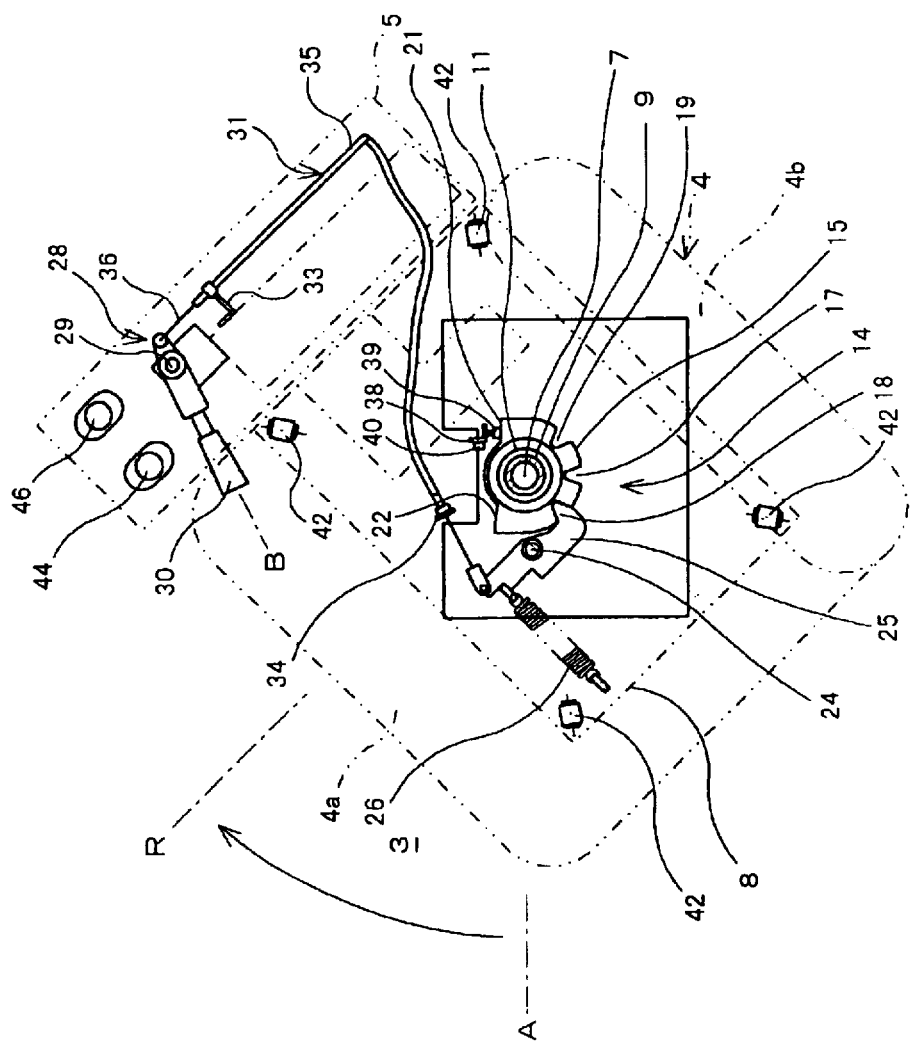
FIG. 3 is a plan view of the fixing means and the release means for the seat of the same industrial vehicle, showing a state in which the seat is fixed at a clockwise rotated position.

In this state, the operator 146 rotates the seat 4 from the forward facing position A to the clockwise rotated position R while sitting on the seat 4, as shown in FIG. 3. In this situation, as shown by the solid line in FIG. 5, in the clockwise rotated position R, the one stopper member 39 abuts against the one stopper surface 21, and therefore the seat 4 accurately stops at the point of time at which it rotates up to the clockwise rotated position R and never goes beyond the clockwise rotated position R, as shown in FIG. 3. When the operator 146 releases the one end of the operating lever 30 in the backward switching position C from his or her hand, the engaging lever 25 swings in the other direction by the force (tensile force) of the coil extension spring 26, then the one end of the engaging lever 25 is engaged with the second notch 18 and the above-described operating lever 30 is pulled by the pull cable 31 to return to the front switching position B from the backward switching position C. As a result, as shown in FIG. 10, the seat 4 is fixed at the clockwise rotated position R, whereby the operator 146 feels comfortable in the rear facing posture and reduction of fatigue and securing of the rear view are facilitated. In this situation, the operator 146 can adjust the speed of the fork lift 1 by depressing the auxiliary accelerator pedal 48.

When getting on and off the seat 4 from a left side, the operator 146 grips the one end of the operating lever 30 to rotate the operating lever 30 from the front switching position B to the backward switching position C. As a result, the other end of the engaging lever 25 is pulled by the wire 36 of the pull cable 31, then the engaging lever 25 swings in one direction, and the one end of the engaging lever 25 is disengaged from the second notch 18, whereby the seat 4 fixed in the clockwise rotated position R is released and the seat 4 is switched into a rotatable state.

Figure 4:
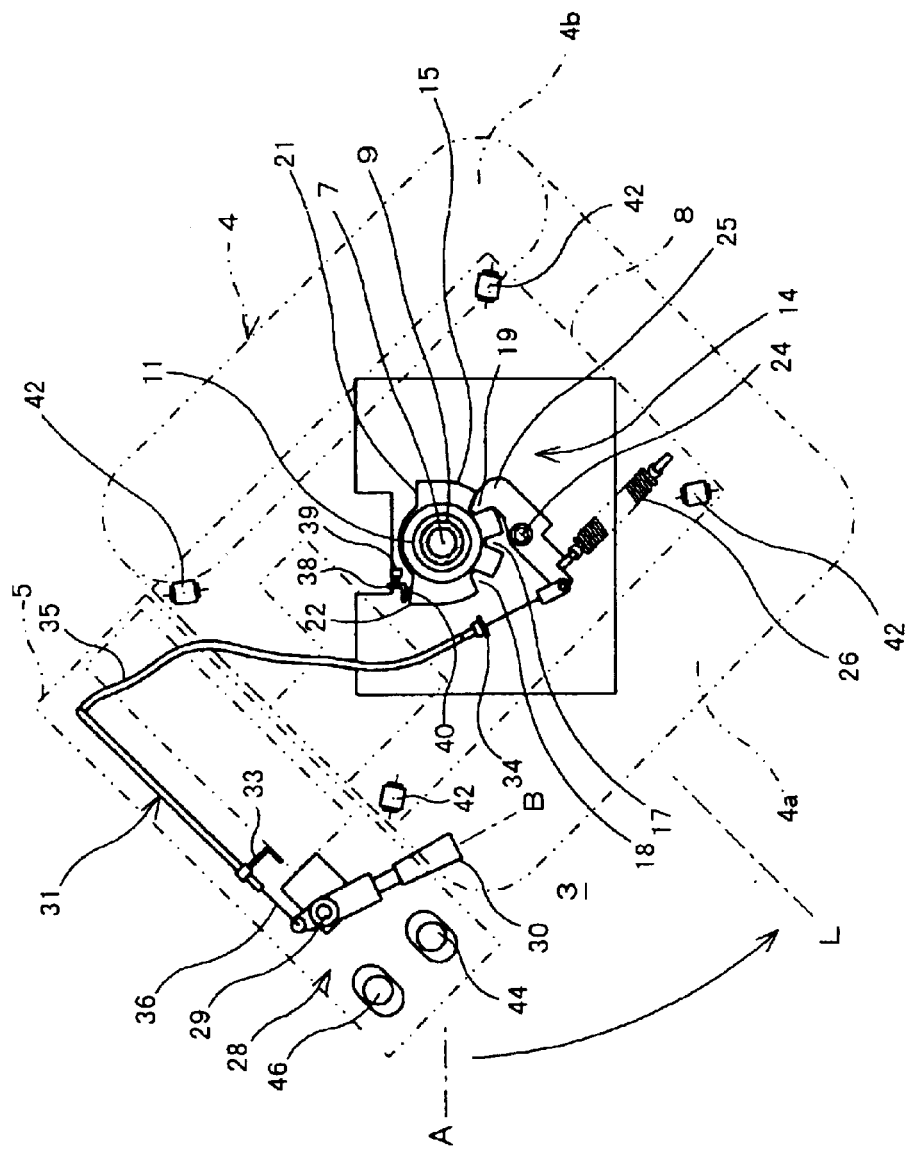
FIG. 4 is a plan view of the fixing means and the release means for the seat of the same industrial vehicle, showing a state in which the seat is fixed at a counterclockwise rotated position.
Figure 11:
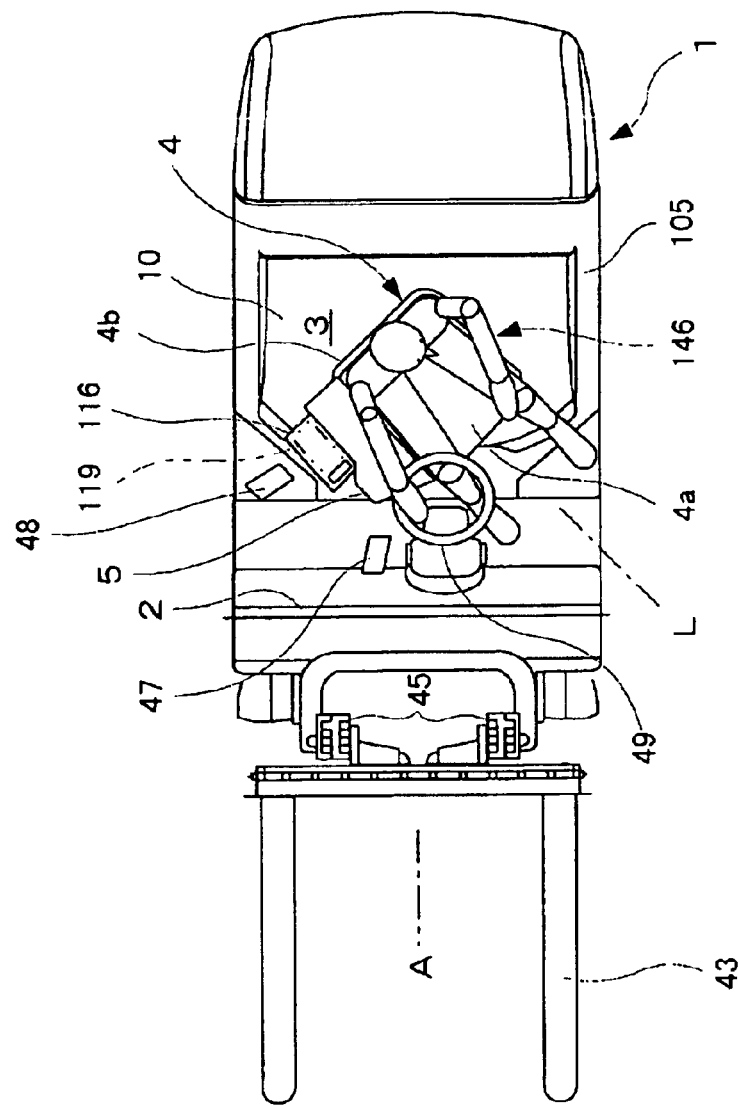
FIG. 11 is a plan view of the same industrial vehicle, showing the state in which the seat is fixed at the counterclockwise rotated position.

In this state, the operator 146 rotates the seat 4 to the counterclockwise rotated position L while sitting on the seat 4 as shown in FIG. 4. In this situation, as shown by a phantom line in FIG. 5, in the counterclockwise rotated position L, the other stopper member 40 abuts against the other stopper surface 22, and therefore the seat 4 stops accurately at the point of time at which it is rotated up to the counterclockwise rotated position L as shown in FIG. 4, and never goes beyond the counterclockwise rotated position L. When the operator 146 releases the one end of the operating lever 30 in the backward switching position C from his or her hand, the engaging lever 25 swings in the other direction by force (tensile force) of the coil extension spring 26, then the one end of the engaging lever 25 is engaged with the third notch 19 and the above-described operating lever 30 is pulled by the pull cable 31 to return to the front switching position B from the backward switching position C. As a result, as shown in FIG. 11, the seat 4 is fixed at the counterclockwise rotated position L and thus the ease with which the operator 146 gets on and off is increased.

Similarly, the operator 146 rotates the operating lever 30 to the backward switching position C from the front switching position B, then with the fixed seat 4 having been released, he or she rotates the seat 4 to the front facing position A as shown in FIG. 2, and the operating lever 30 is returned to the front switching position B as shown in FIG. 1, whereby the one end of the engaging lever 25 is engaged with the first notch 17 and the seat 4 is fixed at the forward facing position A.

Since the seat 4 is easily fixed at the forward facing position A, the clockwise rotated position R and the counterclockwise rotated position L as described above, the seat 4 can be prevented from accidentally rotating.

A load exerted on the seat 4 is distributed via a plurality of rollers 42 and supported on the floor 10. Accordingly, even if the operator with heavy weight 146 sits on the seat 4, the load can be sufficiently supported. Further, since each of the rollers 42 rolls on the floor 10 when the seat 4 is rotated, the seat 4 is smoothly rotated, and the load can be sufficiently supported even during rotation.

In the above-described embodiment, a position rotated at a predetermined angle (about 45 degrees) in the right direction from the forward facing position A is set as the clockwise rotated position R as shown in FIG. 10, and a position rotated at a predetermined angle (about 35 degrees) in the left direction from the forward facing position A is set as the counterclockwise rotated position L as shown in FIG. 11, but the above-described predetermined angles are not limited to 35 degrees and 45 degrees, and they may be, for example, 30 degrees or 60 degrees.

In the above-described embodiment, as shown in FIG. 2, the operating lever 30 is structured to be pulled by the pull cable 31 to automatically return to the front switching position B from the backward switching position C using the force (tensile force) of the coil extension spring 26 when the operator 146 releases the one end of the above-described operating lever 30 from his or her hand after the operating lever 30 is switched to the backward switching position C, but the operator 146 may manually return the operating lever 30 to the front switching position B.

In the above-described embodiment, the engaging lever 25 and the operating lever 30 are connected using the pull cable 31 (an example of the connecting mechanism), but it is not limited to the pull cable 31, but a link mechanism or the like may be used.

In the above-described embodiment, four rollers 42 are provided, but the number is not limited to four.

In the above-described embodiment, the fork lift 1 is used as an example of a vehicle, but it is not limited to the fork lift 1.

Next, a second embodiment of the present invention will be described with reference to FIG. 9 to FIG. 21.

As shown in FIG. 9, the above-described main accelerator pedal 47 is provided to the right and in front of the seat 4 in the forward facing position A, and as shown in FIG. 10, the above-described auxiliary accelerator pedal 48 is provided to the right and in front of the seat 4 in the clockwise rotated position R. When the auxiliary accelerator pedal 48 is depressed, the above-described main accelerator pedal 47 is interlocked with the auxiliary accelerator pedal 48 via an interlock mechanism 55.

Figure 12:
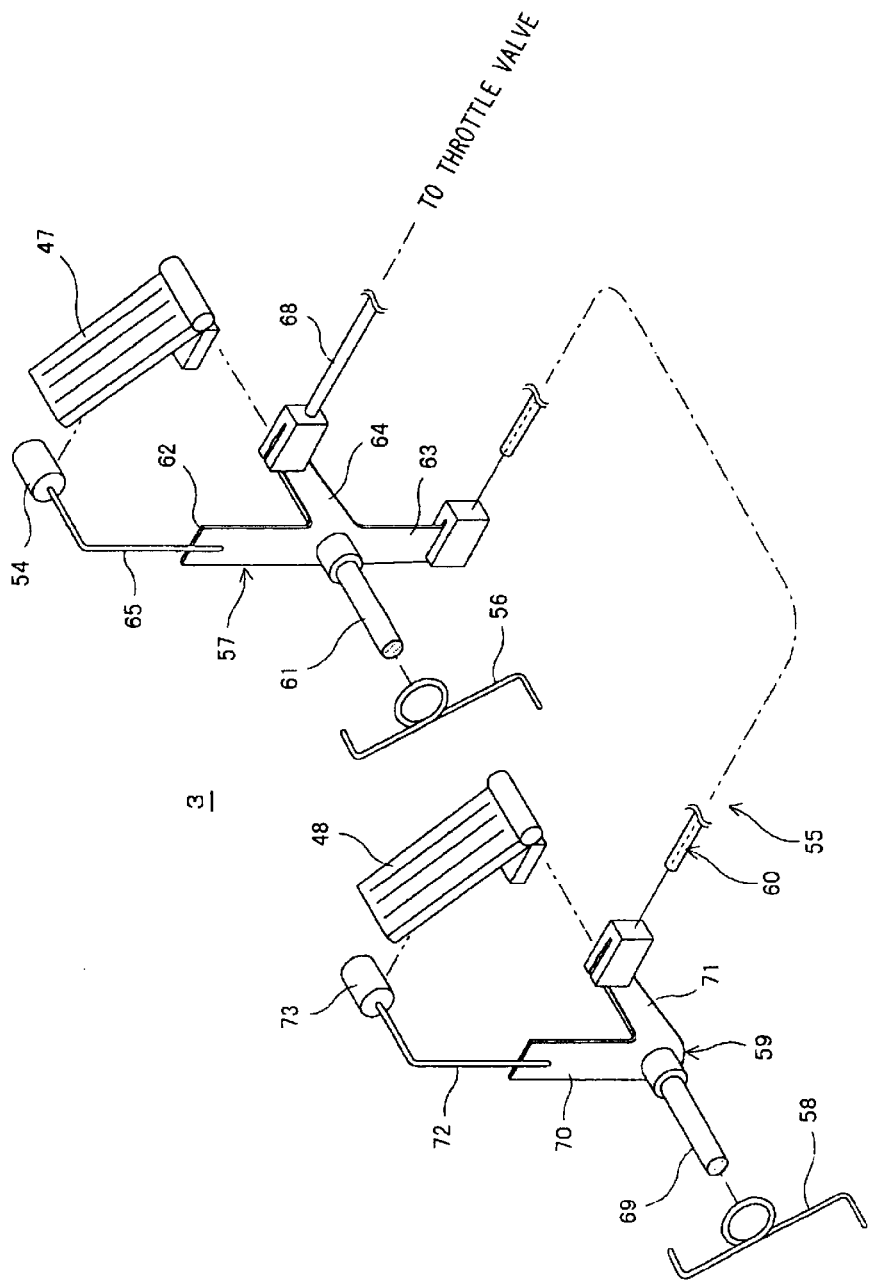
FIG. 12 is an exploded perspective view showing a constitution of an interlock mechanism of an accelerator pedal of an industrial vehicle in a second embodiment of the present invention.

As shown in FIG. 12 and FIG. 13, the above-described interlock mechanism 55 is constituted by a main accelerator link 57 which can be rotated by depressing the main accelerator pedal 47 and returned to an original position by a main return spring 56, an auxiliary accelerator link 59 which can be rotated by depressing the auxiliary accelerator pedal 48 and returned to an original position by an auxiliary spring 58, and a pull cable 60 (an example of an interlock cable) connecting both the above-described accelerator links 57 and 59.

The above-described main accelerator link 57 is fitted onto a main support shaft 61 horizontally provided at the driver's room 3, and has vertical first and second arms 62 and 63 and a diagonally upward third arm 64. A rollable main supporting roller 54 in contact with a back side of the above-described main accelerator pedal 47 is provided at a tip end of a main fitting shaft 65 provided at the above-described first arm 62.

The above-described main return spring 56 is fitted onto the above-described main support shaft 61, and one end of the above-described pull cable 60 is connected to a tip end of the above-described second arm 63. A throttle valve 67 of an engine 66 provided at the vehicle body 2 is connected to the third arm 64 via a pull cable 68 for a throttle (one example of a throttle cable).

The above-described auxiliary accelerator link 59 is fitted onto an auxiliary support shaft 69 horizontally provided at the driver's room 3, and has a first arm 70 facing upward and a second arm 71 facing diagonally upward. A rollable auxiliary supporting roller 73 in contact with a back side of the above-described auxiliary accelerator pedal 48 is provided at a tip end of an auxiliary fitting shaft 72 provided at the above-described first arm 70.

The above-described auxiliary return spring 58 is fitted onto the above-described auxiliary support shaft 69, and the other end of the above-described pull cable 60 is connected to a tip end of the above-described second arm 71. The above-described pull cable 60 has a construction in which a wire is drawn through a fixed covering member, and it can transmit force via the above-described wire only when it is pulled. Both the above-described supporting rollers 54 and 73 project above the floor 10 of the driver's room 3, and other components are housed under the floor 10.

An operation in the above-described second embodiment will be described below.

When running the fork lift 1 forward, the operator 146 drives it facing forward while sitting on the seat 4 with the seat 4 remaining in the forward facing position A, as shown in FIG. 9. In this case, the operator 146 operates the main accelerator pedal 47 with his or her right foot.

When running the fork lift 1 backward, the operator 146 rotates the seat 4 to the clockwise rotated position R from the forward facing position A as shown in FIG. 10, whereby the operator 146 is comfortable in the rear facing posture while manipulating the steering wheel with his or her left hand, thus facilitating reduction of fatigue and securing of the rear view. In this case, the operator 146 operates the auxiliary accelerator pedal 48 with his or her right foot.

Since the accelerator pedals 47 and 48 are provided at two positions as described above and the main accelerator pedal 47 is provided to the right and in front of the seat 4 in the forward facing position A as shown in FIG. 9, the operator 146 can easily operate the main accelerator pedal 47 with his or her right foot during forward running. Since the auxiliary accelerator pedal 48 is provided to the right and in front of the seat 4 in the clockwise rotated position R as shown in FIG. 10, the operator 146 can also easily operate the auxiliary accelerator pedal 48 with his or her right foot during backward running.

When the main accelerator pedal 47 is depressed during forward running as shown by a phantom line in FIG. 14, the main accelerator link 57 is rotated in one direction D against the force of the main return spring 56, and thereby the pull cable 68 for the throttle is pulled to open the throttle valve 67.

When depressing force on the main accelerator pedal 47 is decreased or the right foot is taken off the main accelerator pedal 47, the main accelerator link 57 is rotated in the other direction E by the force of the main return spring 56 and returned to the original position, whereby the throttle valve 67 is closed, as shown by a solid line in FIG. 14.

Figure 15:
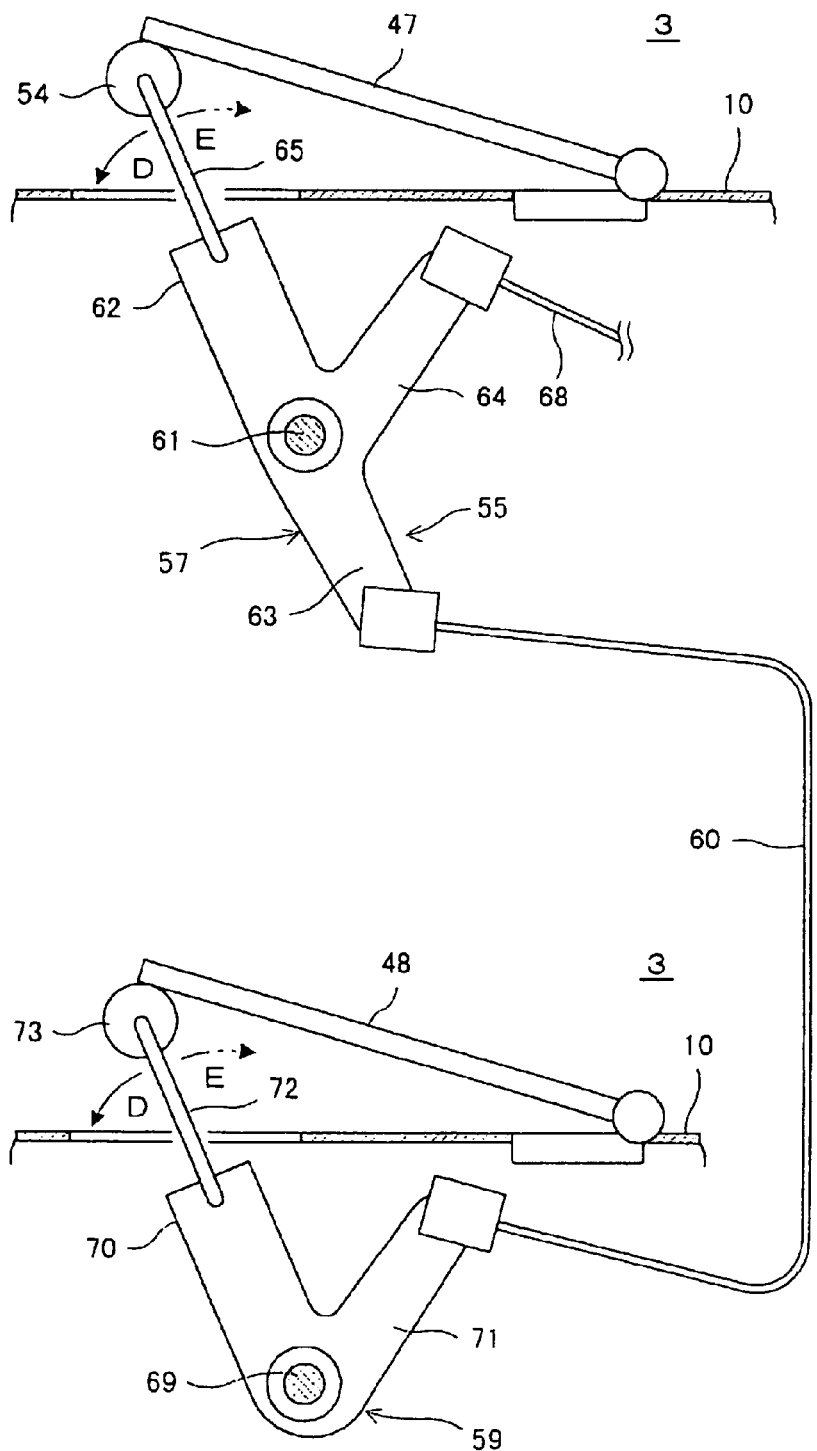
FIG. 15 is a diagram showing an operation of the interlock mechanism when an auxiliary accelerator pedal of the same industrial vehicle is depressed.

When the auxiliary accelerator pedal 48 is depressed during backward running as shown in FIG. 15, the auxiliary accelerator link 59 is rotated in the one direction D against the force of the auxiliary return spring 58, and thus the pull cable 60 is pulled, whereby the main accelerator link 57 is rotated in the one direction D against the force of the main return spring 56 and thereby the pull cable 68 for the throttle is pulled to open the throttle valve 67.

When depressing force on the auxiliary accelerator pedal 48 is decreased or the right foot is taken off the auxiliary accelerator pedal 48, the auxiliary accelerator link 59 is rotated in the other direction E by the force of the auxiliary return spring 58 and returned to the original position, and the main accelerator link 57 is also rotated in the other direction E by the force of the main return spring 56 and returned to the original position to close the throttle valve 67, as shown in FIG. 13.

In the above-described second embodiment, as shown in FIG. 15, when the auxiliary accelerator pedal 48 is depressed, the auxiliary accelerator link 59 is rotated in the one direction D against the force of the auxiliary return spring 58, and the main accelerator link 57 is rotated in the one direction D against the force of the main return spring 56. As a result, when the auxiliary accelerator pedal 48 is depressed, the total of the resistance by the force of the above-described auxiliary return spring 58 (see FIG. 12) and the resistance by the force of the above-described main return spring 56 (see FIG. 12) is exerted on the auxiliary accelerator pedal 48, and therefore large depressing force is required.

In consideration of the above, a structure which makes it possible to reduce depressing force on operating each of the accelerator pedals 47 and 48 will be explained below based on FIG. 16 to FIG. 21 as a third embodiment of the present invention.

Figure 16:
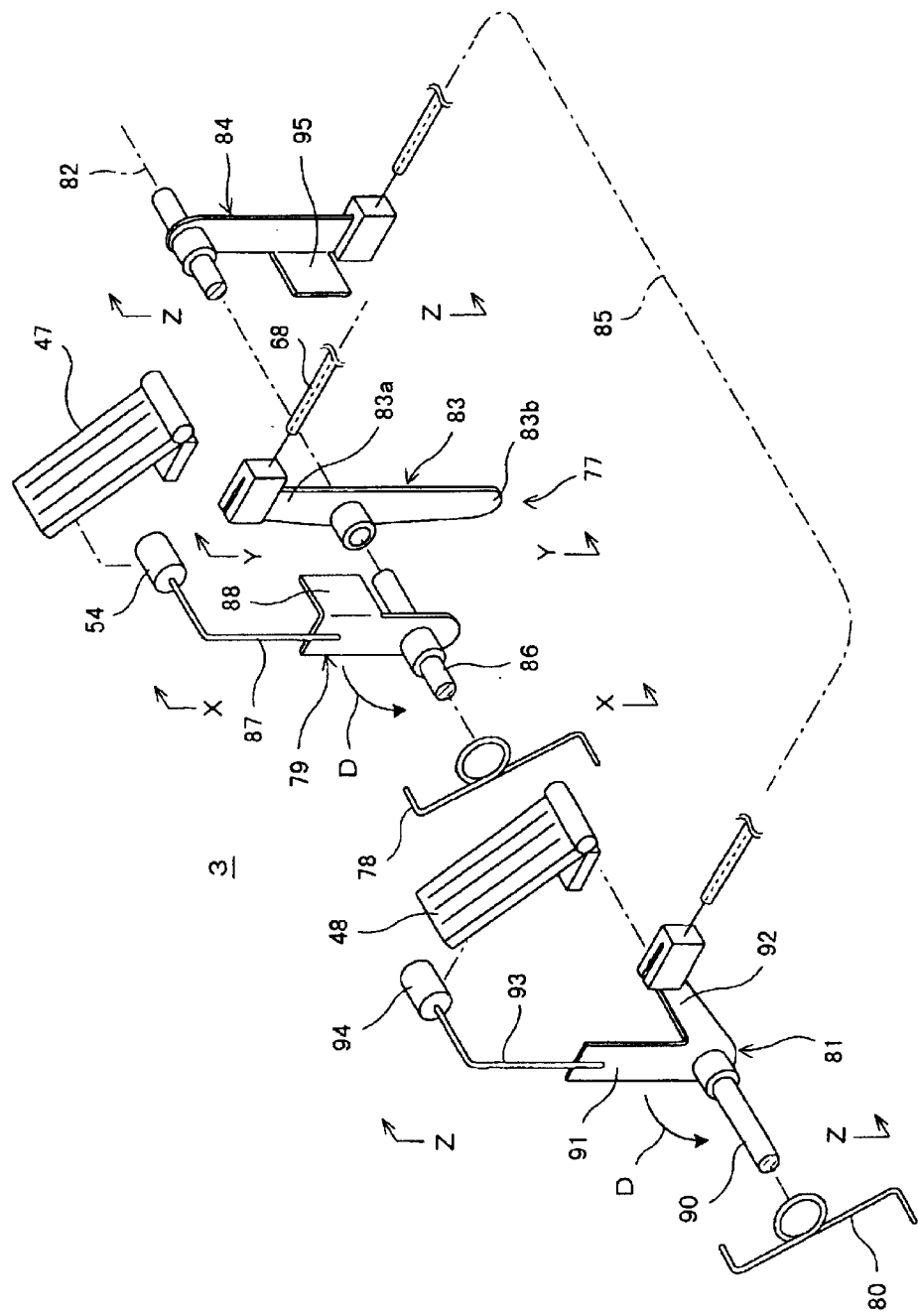
FIG. 16 is an exploded perspective view showing a constitution of an interlock mechanism of an accelerator pedal of an industrial vehicle in a third embodiment of the present invention.

As shown in FIG. 16, an interlock mechanism 77 interlocking with the throttle valve 67 is provided between the main accelerator pedal 47 and the auxiliary accelerator pedal 48.

The above-described interlock mechanism 77 is constituted by a main accelerator link 79 which can be rotated by depressing the main accelerator pedal 47 and returned to an original position by a main return spring 78, an auxiliary accelerator link 81 which can be rotated by depressing an auxiliary accelerator pedal 48 and returned to an original position by an auxiliary return spring 80, one and the second intermediate links 83 and 84 which can be rotated about the same axis 82 as the above-described main accelerator link 79, and a pull cable 85 (an example of an interlock cable) connecting the above-described auxiliary accelerator link 81 and the second intermediate link 84.

Figure 17:
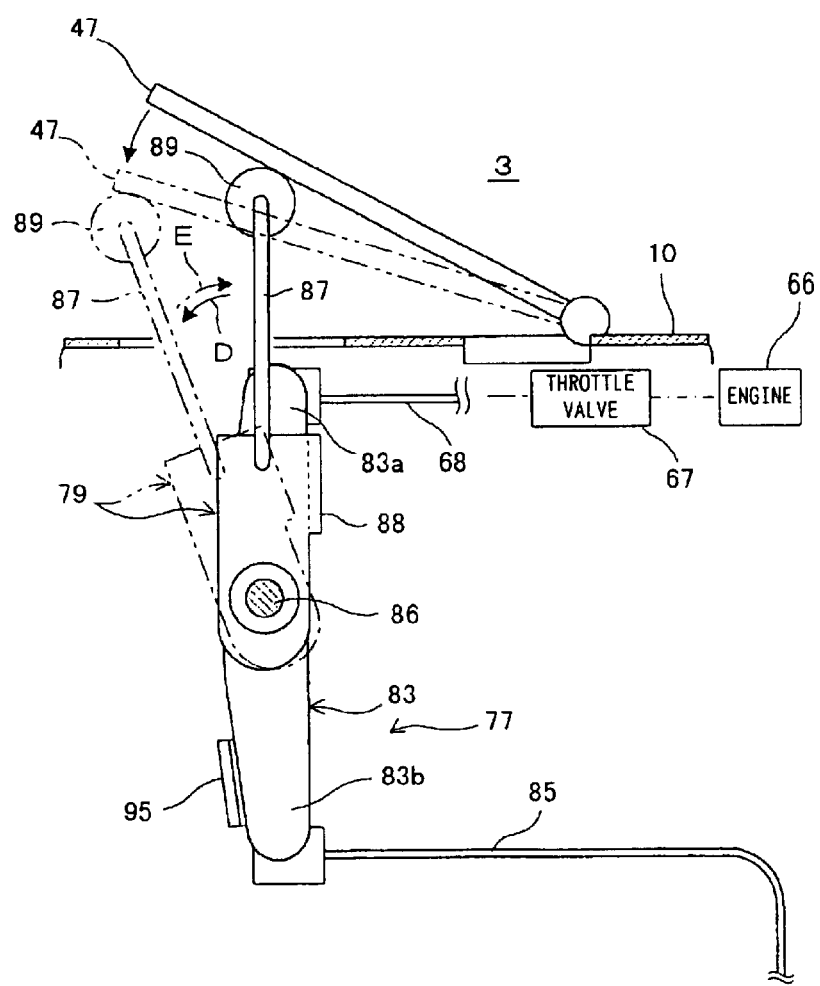
FIG. 17 is a view taken along arrows X—X in FIG. 16.

The above-described main accelerator link 79, the one and the second intermediate links 83 and 84, and the main return spring 78 are fitted onto a main supporting shaft 86 horizontally provided at the driver's room 3. As shown in FIG. 16 and FIG. 17, a main fitting shaft 87 and a main engaging piece 88 (an example of a main engaging member) are provided at a free end of the above-described main accelerator link 79. A rollable main supporting roller 89 in contact with the back side of the main accelerator pedal 47 is provided at a tip end of the above-described main fitting shaft 87. The above-described main engaging piece 88 is constructed to be engageable with one end portion 83a of the above-described first intermediate link 83 from the one direction D when the main accelerator link 79 is rotated in the one direction D.

Figure 19:
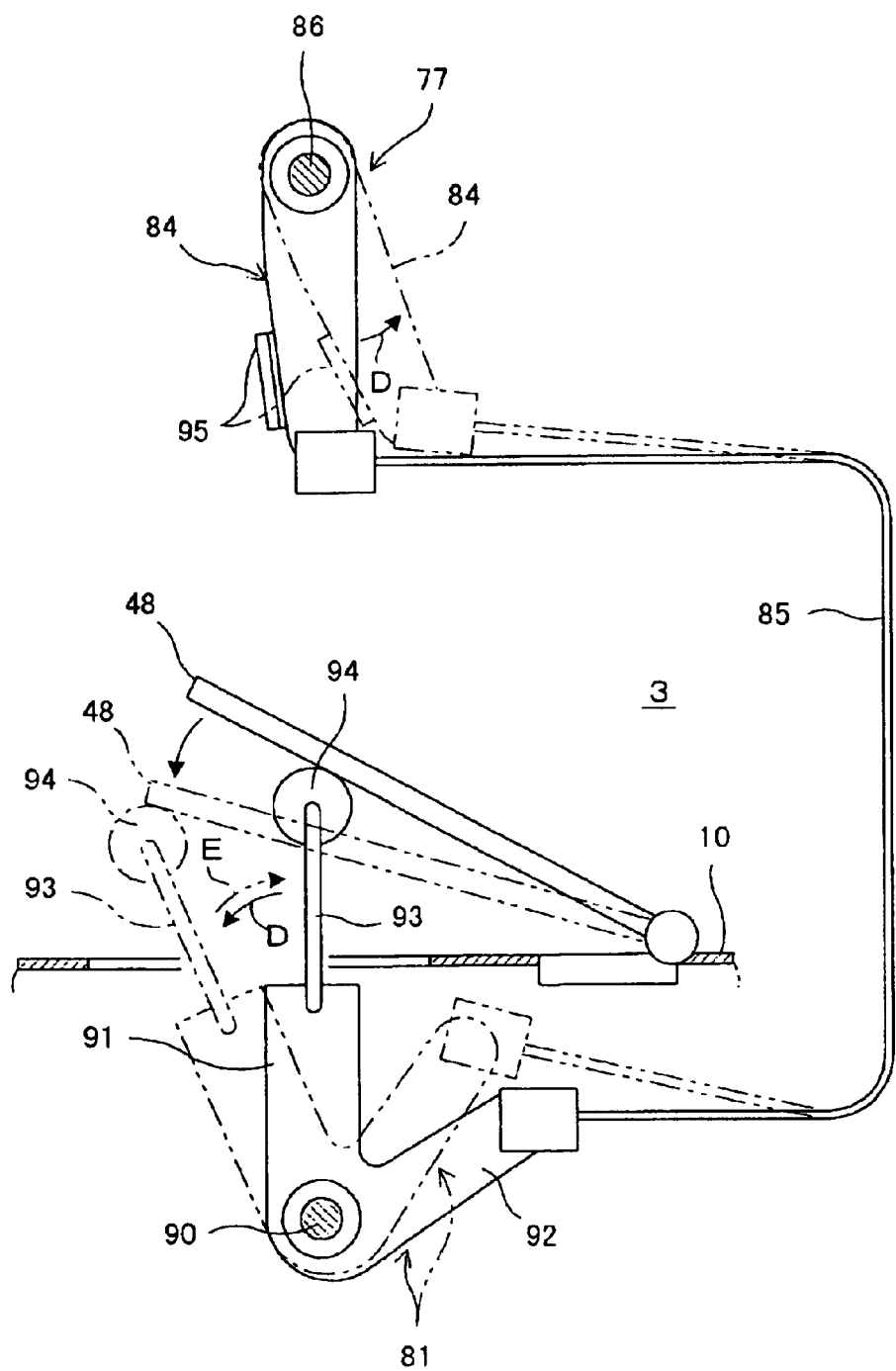
FIG. 19 is a view taken along arrows Z—Z in FIG. 16.

As shown in FIG. 16 and FIG. 19, the above-described auxiliary accelerator link 81 is fitted onto an auxiliary supporting shaft 90 horizontally provided at the driver's room 3, and has a first arm 91 facing upward and a second arm 92 facing diagonally upward. A rollable auxiliary supporting roller 94 in contact with the back side of the auxiliary accelerator pedal 48 is provided at a tip end of an auxiliary fitting shaft 93 provided at the above-described first arm 91.

Figure 18:
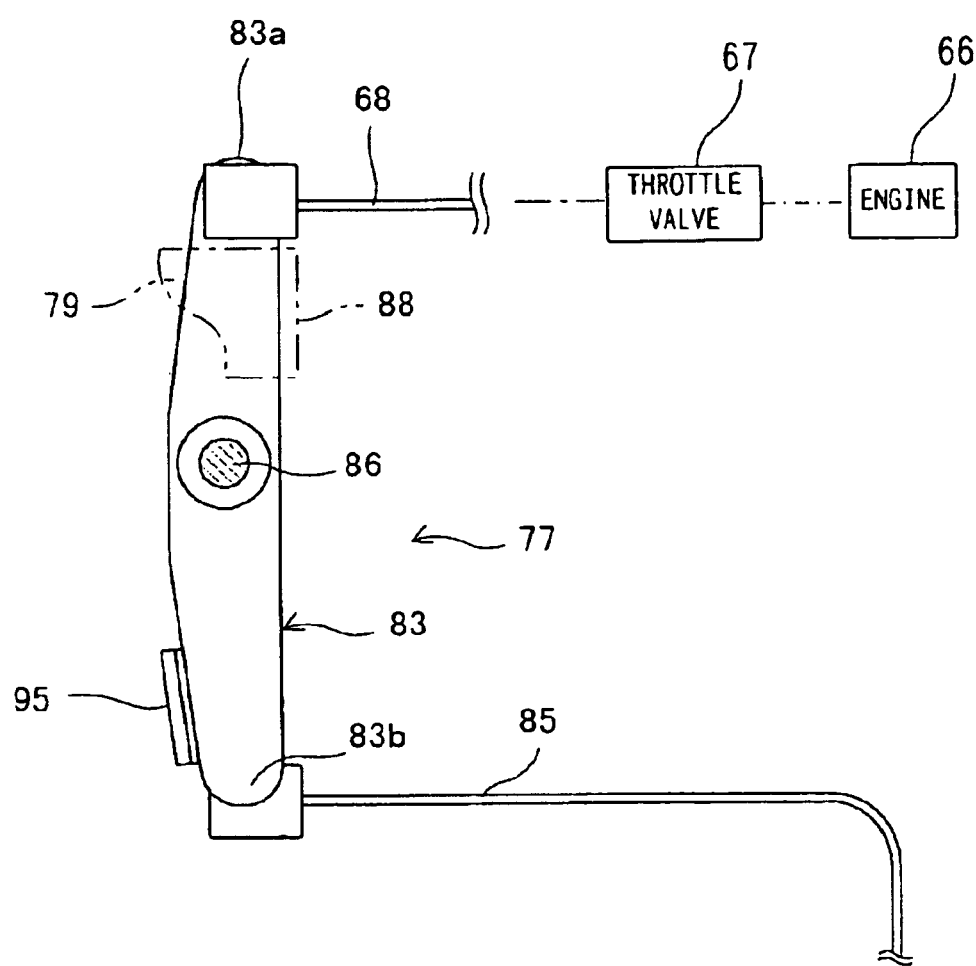
FIG. 18 is a view taken along arrows Y—Y in FIG. 16.

The above-described auxiliary return spring 80 is fitted onto the above-described auxiliary supporting shaft 90. Further, an intermediate engaging piece 95 (an example of an intermediate engaging member) is provided at a free end portion of the above-described second intermediate link 84. The intermediate engaging piece 95 is constructed to be engageable with the other end portion 83b of the above-described first intermediate link 83 from the one direction D, when the second intermediate link 84 is rotated in the one direction D. Specifically, as shown in FIG. 18, the above-described intermediate engaging piece 95 is located forward of the other end portion 83b of the first intermediate link 83, and the above-described main engaging piece 88 is located rearward of the one end portion 83a of the first intermediate link 83.

As shown in FIG. 16, one end of the above-described pull cable 85 is connected to a tip end of the second arm 92 of the auxiliary accelerator link 81, and the other end is connected to a free end portion of the second intermediate link 84. Further, one end of the pull cable 68 for the throttle (an example of the throttle cable) is connected to the end portion 83a of the above-described first intermediate link 83, and the other end is connected to the throttle valve 67 of the engine 66. Both the above-described supporting rollers 89 and 94 project above the floor 10 of the driver's room 3, and the other components are housed under the floor 10.

An operation in the above-described third embodiment will be described below.

When the main accelerator pedal 47 is depressed during forward running as shown by a phantom line in FIG. 17, the main accelerator link 79 is rotated in the one direction D against the force of the main return spring 78. In this situation, as shown in FIG. 20, the main engaging piece 88 of the main accelerator link 79 is engaged with the one end portion 83a of the first intermediate link 83 from the one direction D, and therefore the first intermediate link 83 is rotated in the one direction D together with the main accelerator link 79 via the main engaging piece 88. As a result, the pull cable 68 for the throttle is pulled to open the throttle valve 67.

When the main accelerator link 79 is rotated in the one direction D and the main engaging piece 88 is engaged with the one end portion 83a of the first intermediate link 83 as described above, the intermediate engaging piece 95 of the second intermediate link 84 is spaced from the other end portion 83b of the first intermediate link 83, and therefore the auxiliary accelerator link 81 and the second intermediate link 84 are not rotated but remain stopping while the above-described main accelerator link 79 and the first intermediate link 83 are rotated in the one direction D.

When the auxiliary accelerator pedal 48 is depressed during backward running as shown by a phantom line in FIG. 19, the auxiliary accelerator link 81 is rotated in the one direction D against the force of the auxiliary return spring 80, and the auxiliary accelerator link 81 pulls the pull cable 85, whereby the second intermediate link 84 is rotated in the one direction D together with the auxiliary accelerator link 81. In this situation, as shown in FIG. 21, the intermediate engaging piece 95 of the second intermediate link 84 is engaged with the other end portion 83b of the first intermediate link 83 from the one direction D, and therefore the first intermediate link 83 is rotated in the one direction D together with the second intermediate link 84 via the intermediate engaging piece 95. As a result, the pull cable 68 for the throttle is pulled to open the throttle valve 67.

When the auxiliary accelerator link 81 is rotated in the one direction D and the intermediate engaging piece 95 is engaged with the other end portion 83b of the first intermediate link 83 as described above, the main engaging piece 88 of the main accelerator link 79 is spaced from the one end portion 83a of the first intermediate link 83, and therefore the main accelerator link 79 is not rotated but remains stopping while the auxiliary accelerator link 81, the first intermediate link 83 and the second intermediate link 84 are rotated in the one direction D.

When the main accelerator pedal 47 is depressed as described above, the main accelerator link 79 is rotated in the one direction D but the auxiliary accelerator link 81 is not rotated, while when the auxiliary accelerator pedal 48 is depressed, the auxiliary accelerator link 81 is rotated in the one direction D but the main accelerator link 79 is not rotated. As a result, when the main accelerator pedal 47 is depressed, only the resistance by the force of the main return spring 78 is exerted on the main accelerator pedal 47, and therefore the main accelerator pedal 47 can be depressed by a depressing force against the force of the above-described main return spring 78. When the auxiliary accelerator pedal 48 is depressed, only the resistance by the force of the auxiliary return spring 80 is exerted on the auxiliary accelerator pedal 48, and therefore the auxiliary accelerator pedal 48 can be depressed by a depressing force against the force of the above-described auxiliary return spring 80. Accordingly, the depressing force in the operation of the auxiliary accelerator pedal 48 in the third embodiment is reduced as compared with that in the second embodiment.

In the above-described third embodiment, the auxiliary accelerator pedal 48 is depressed during backward running, but it is possible to depress the auxiliary accelerator pedal 48 during forward running.

Next, a fourth embodiment of the present invention will be described with reference to FIG. 9 to FIG. 11 and FIG. 22 to FIG. 31.

As shown in FIG. 9 to FIG. 11, the driver's room 3 of the vehicle body 2 is provided with a bonnet 105 covering the engine 66. A top surface of the above-described bonnet 105 is formed as a floor 10.

Figure 22:
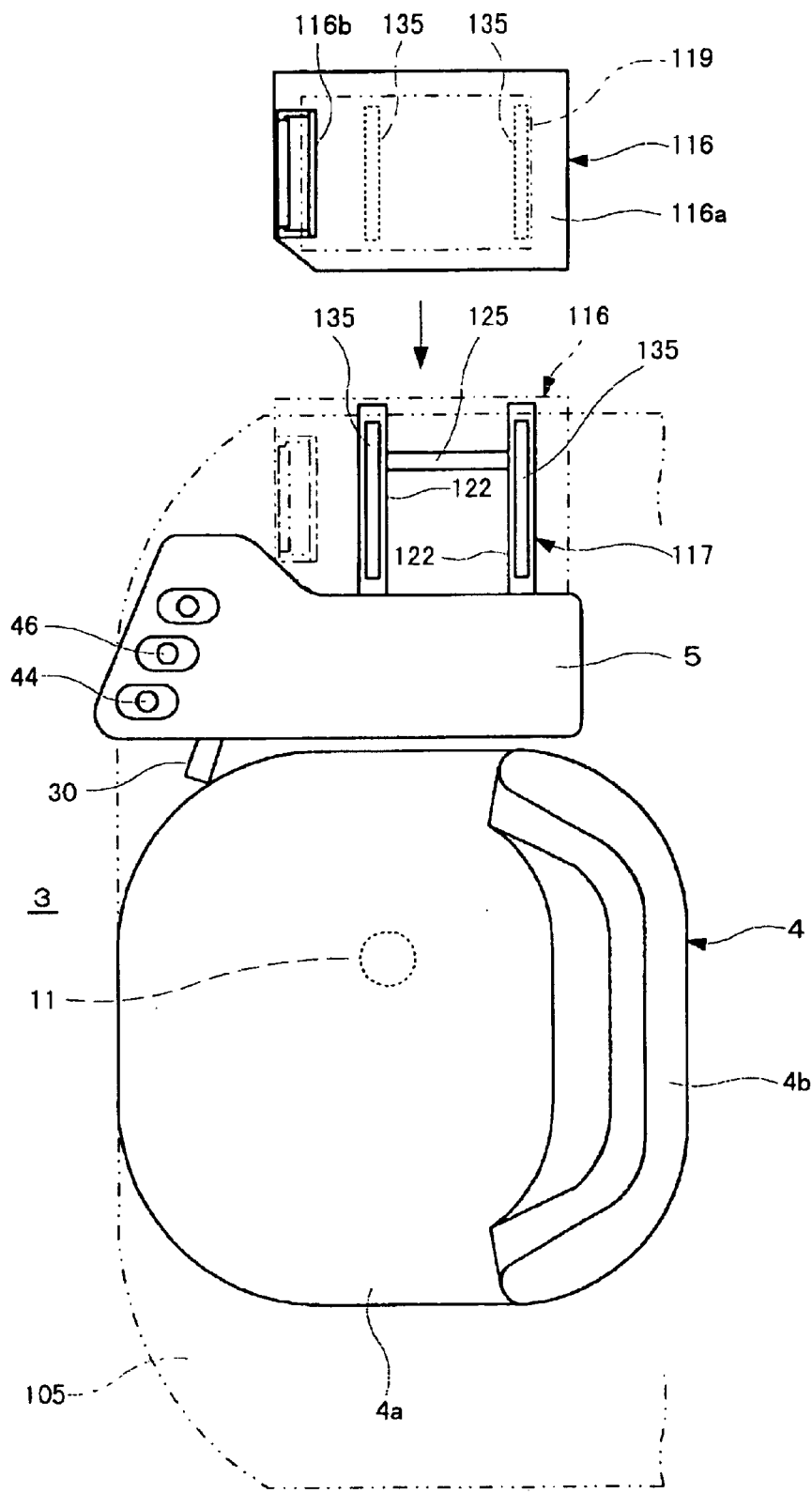
FIG. 22 is a plan view of a seat of an industrial vehicle in a fourth invention of the present invention.
Figure 23:
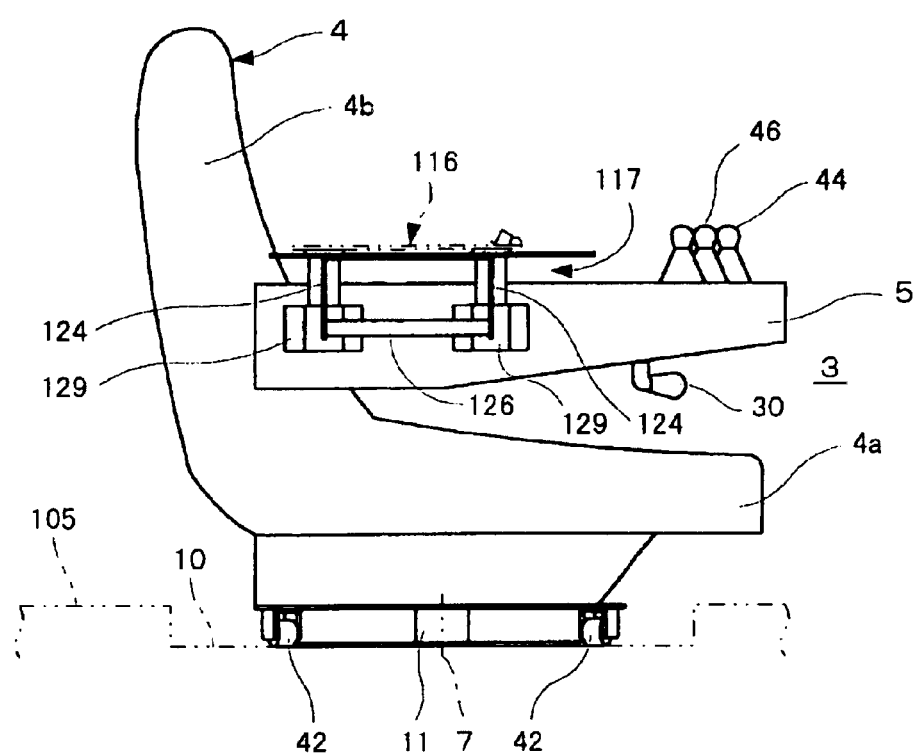
FIG. 23 is a right side view of the seat of the same industrial vehicle.
Figure 24:
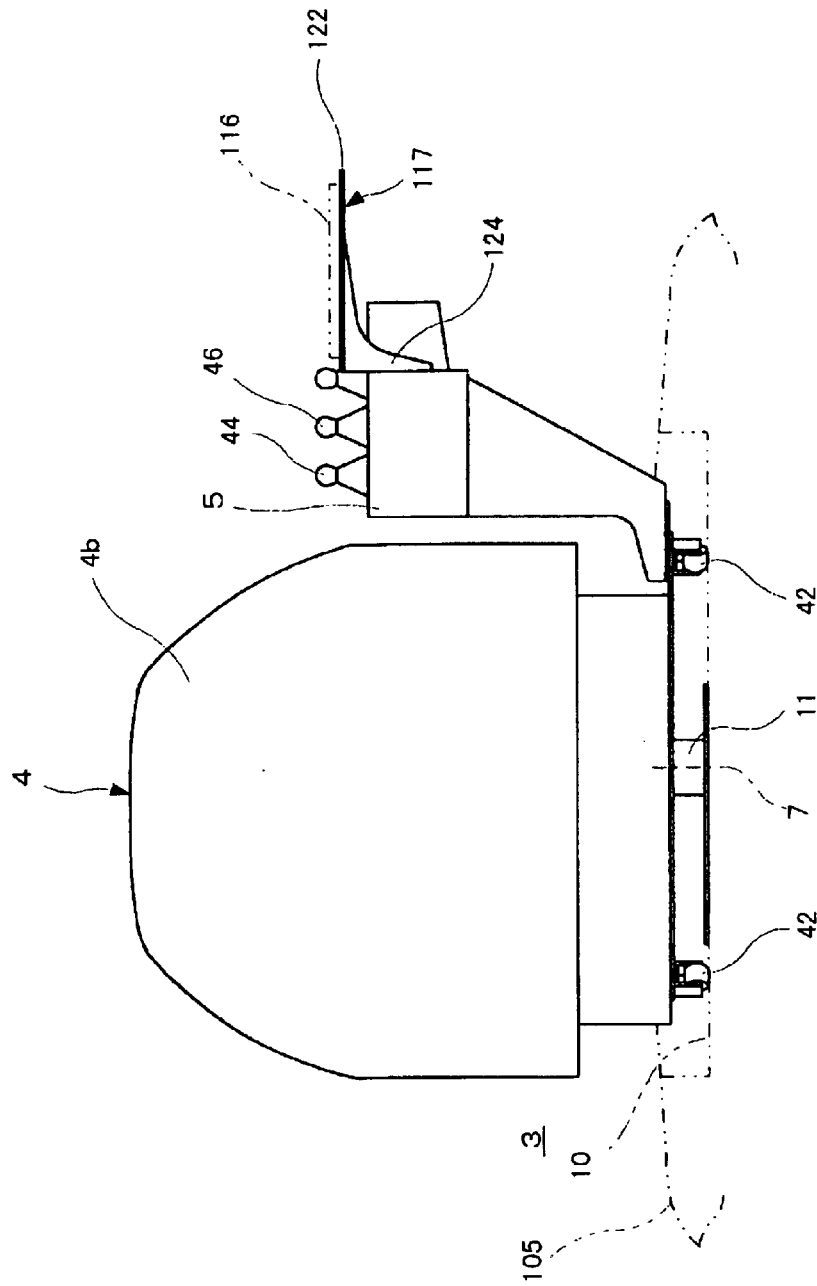
FIG. 24 is a rear view of the seat of the same industrial vehicle.

As shown in FIG. 10 and FIG. 11, when the above-described seat 4 is rotated, the arm rest 5 is rotated together with the seat 4. As shown in FIG. 22 to FIG. 24, a mount 117 for bearing a binder 116 (an example of a document holder) is detachably mounted at a right side surface of the arm rest 5.

The above-described binder 116 is for holding a document 119 such as, for example, a storage and retrieval slip, and is constituted by a main body 116a in a rectangular thin plate form and a clipper fitting 116b provided at a top surface of the main body 116a and clipping the document 119. The clipper fitting 116b is urged in a direction to pinch the document 119 by a spring or the like.

The above-described mount 117 is constructed as follows. Specifically, as shown in FIG. 26 to FIG. 29, longitudinally-facing insertion frames 123 in a flat plate form (an example of a receiving part) are vertically provided at one end of a pair of front and rear lateral frames 122 in a flat plate form. L-shaped reinforcing plates 124 are provided from bottom surfaces of both the above-described lateral frames 122 extending over side surfaces of both the insertion frames 123. The other end of both the above-described lateral frames 122 is connected with an upper connecting frame 125 in a flat plate form, and lower end portions of both the above-described reinforcing plates 124 are connected with a lower connecting frame 126 in a flat plate form.

The mount 117 with the structure as described above is detachably mounted to a pair of front and rear mounting brackets 129 provided on a right side surface of the arm rest 5, and both the brackets 129 are constituted as follows.

Figure 29:
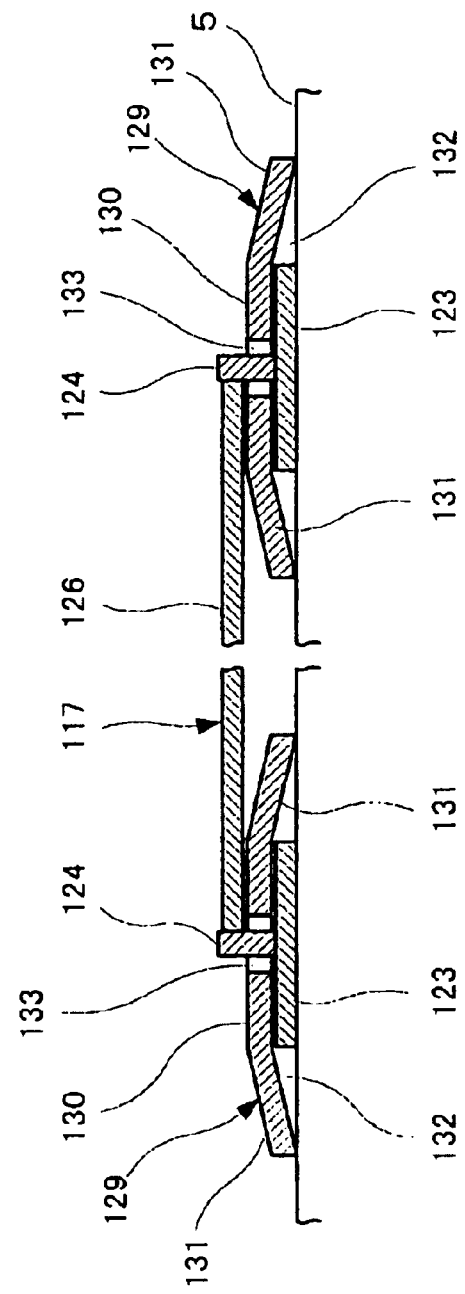
FIG. 29 is a transverse cross-sectional view showing a state in which an insertion frame of the mount is inserted into an insertion hole of the arm rest of the seat of the same industrial vehicle.
Figure 30:
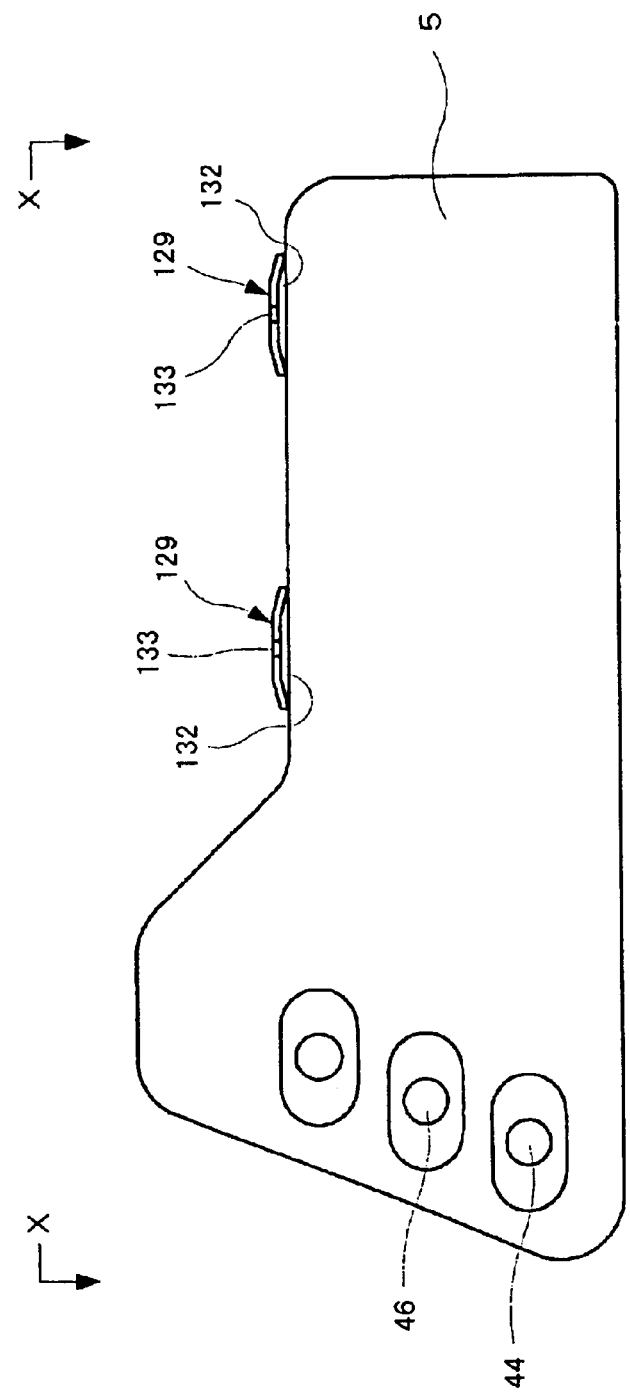
FIG. 30 is a plan view of the arm rest of the seat of the same industrial vehicle.
Figure 31:
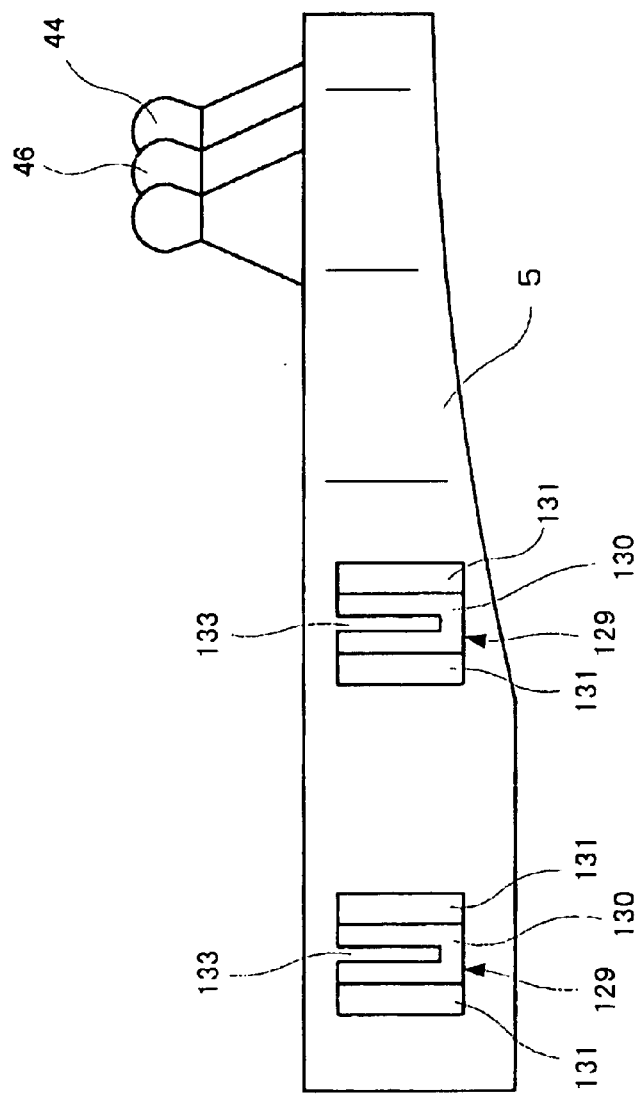
FIG. 31 is a right side view (taken along the arrows X—X in FIG. 9) of the arm rest of the seat of the same industrial vehicle.
Figure 32:
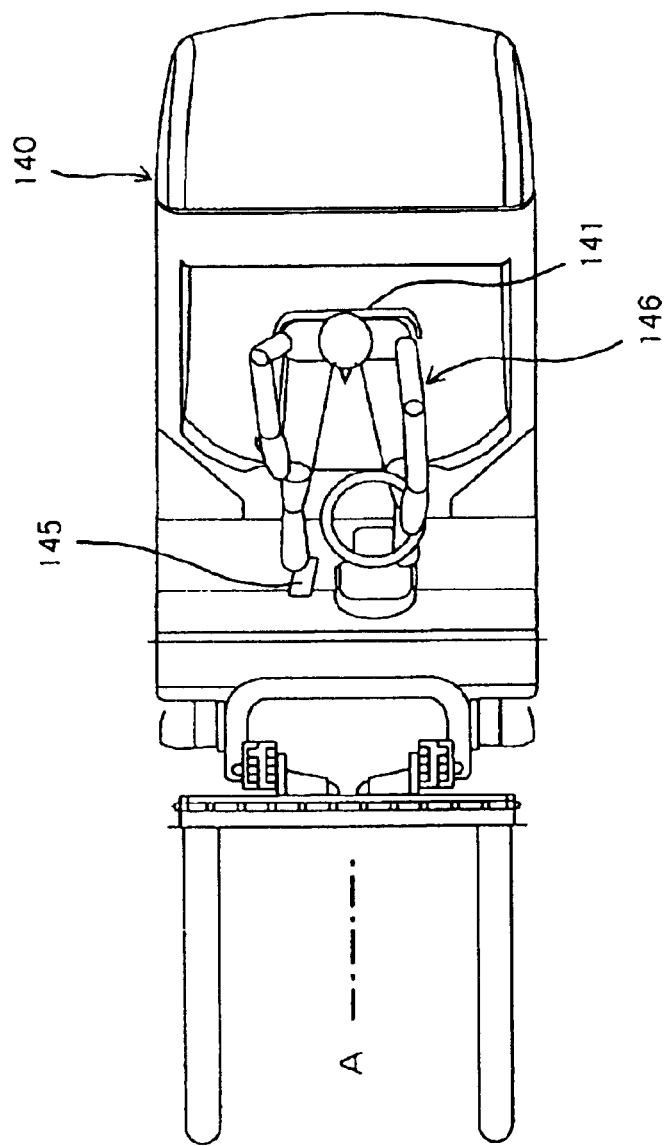
FIG. 32 is a plan view of an industrial vehicle of a prior art, showing a state in which a seat is set at the forward facing position.
Figure 33:
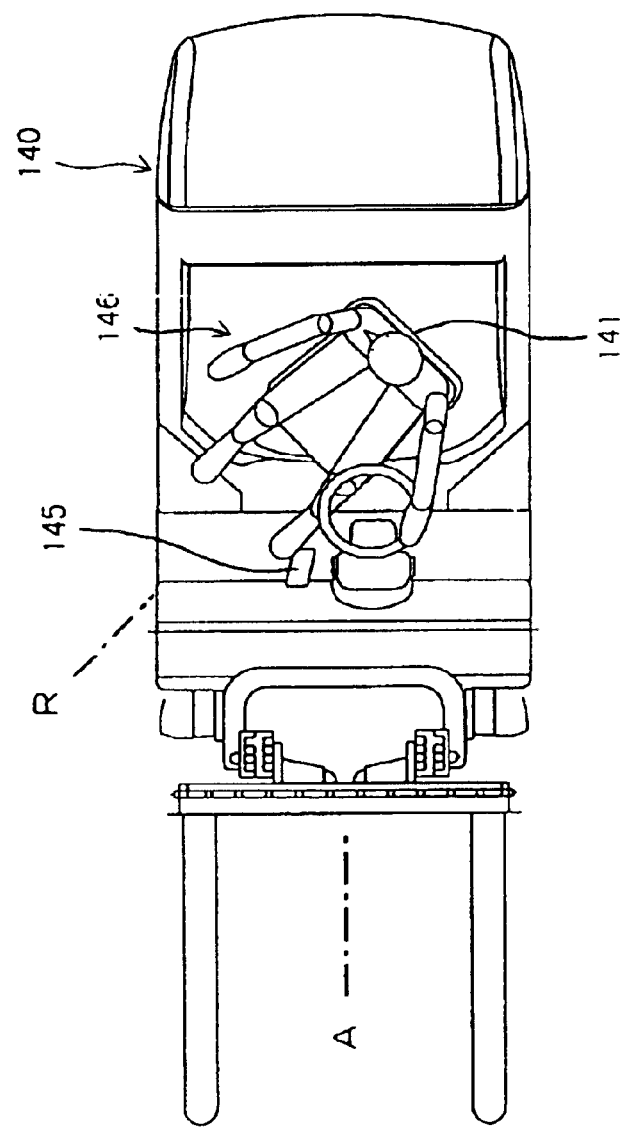
FIG. 33 is a plan view of the industrial vehicle of the prior art, showing a state in which the seat is set at a clockwise rotated position.
Figure 34:
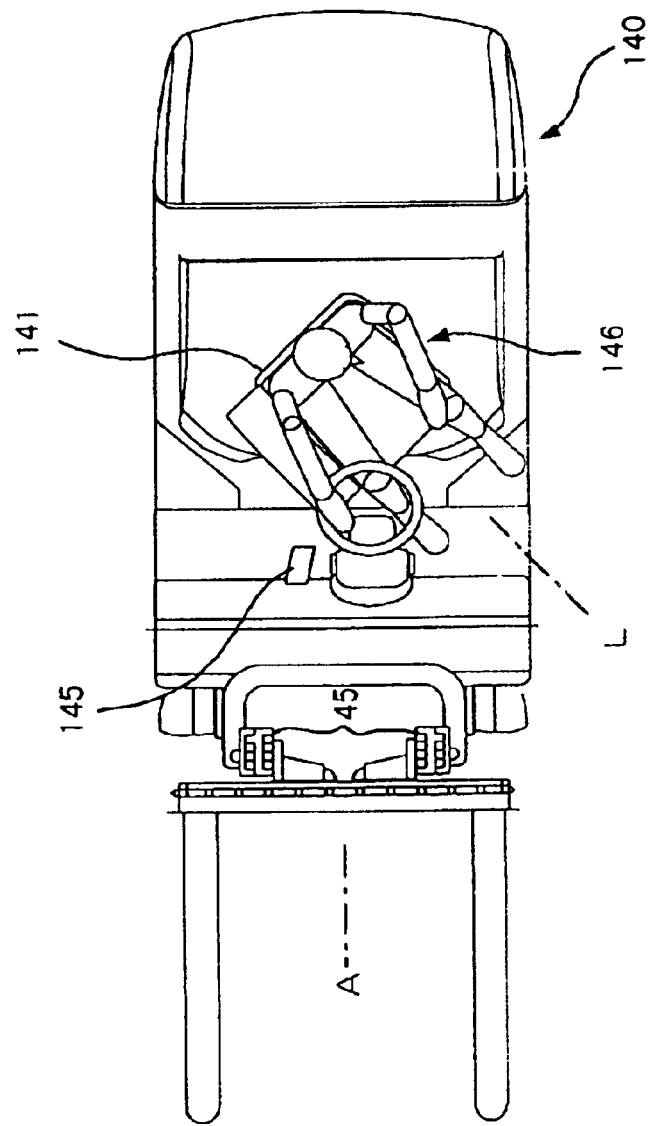
FIG. 34 is a plan view of the industrial vehicle of the prior art, showing a state in which the seat is set at a counterclockwise rotated position.
Figure 35:
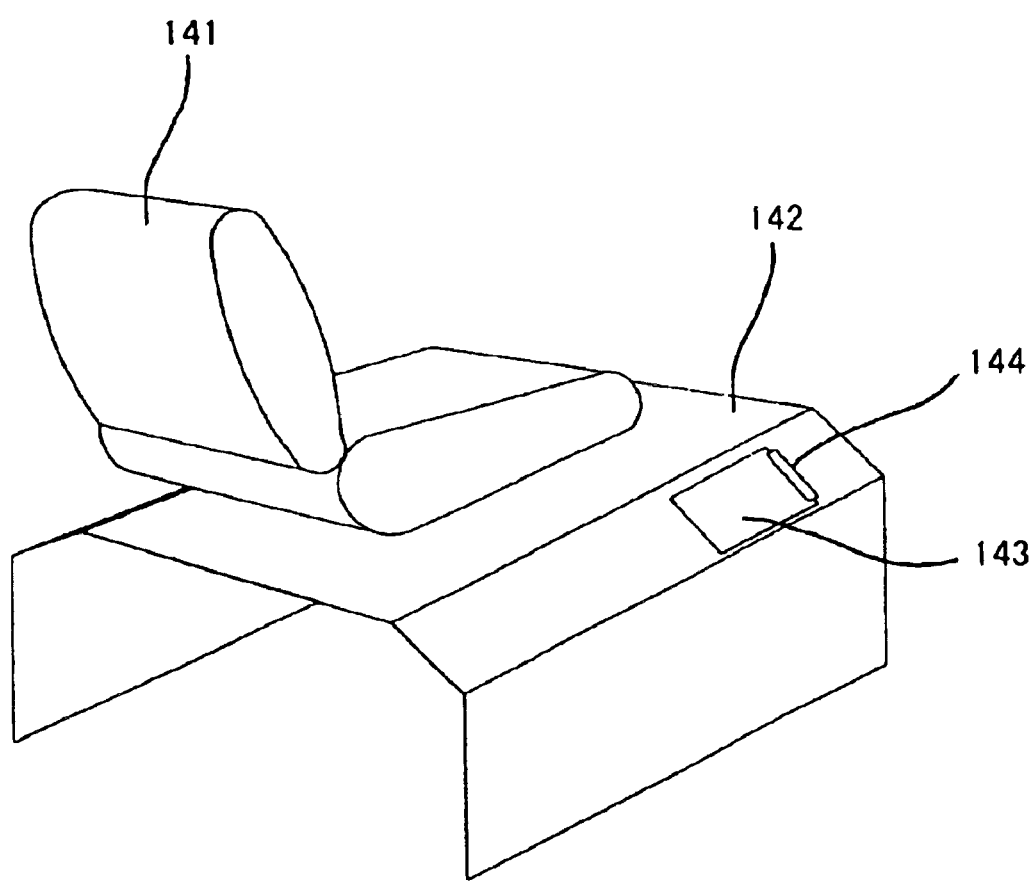
FIG. 35 is a perspective view of the seat of the industrial vehicle of the prior art.

Specifically, as shown in FIG. 29 to FIG. 31, both the above-described brackets 129 are formed in a trapezoidal shape in plan view each with a middle longitudinal plate 130 facing to a right side of the arm rest 5 with a fixed space therebetween, and end longitudinal plates 131 continuously and diagonally provided at both front and rear ends of the middle longitudinal plate 130 to be fixed to the right side surface of the arm rest 5. As a result, an insertion hole 132 (an example of an inserted part) is formed between the middle longitudinal plates 130 of both the brackets 129 and the right side surface of the arm rest 5. A notch 133 in a vertical direction is formed at the above-described middle longitudinal plate 130, and an upper portion of this notch 133 is opened to an upper end surface of the middle longitudinal plate 130.

Figure 27:
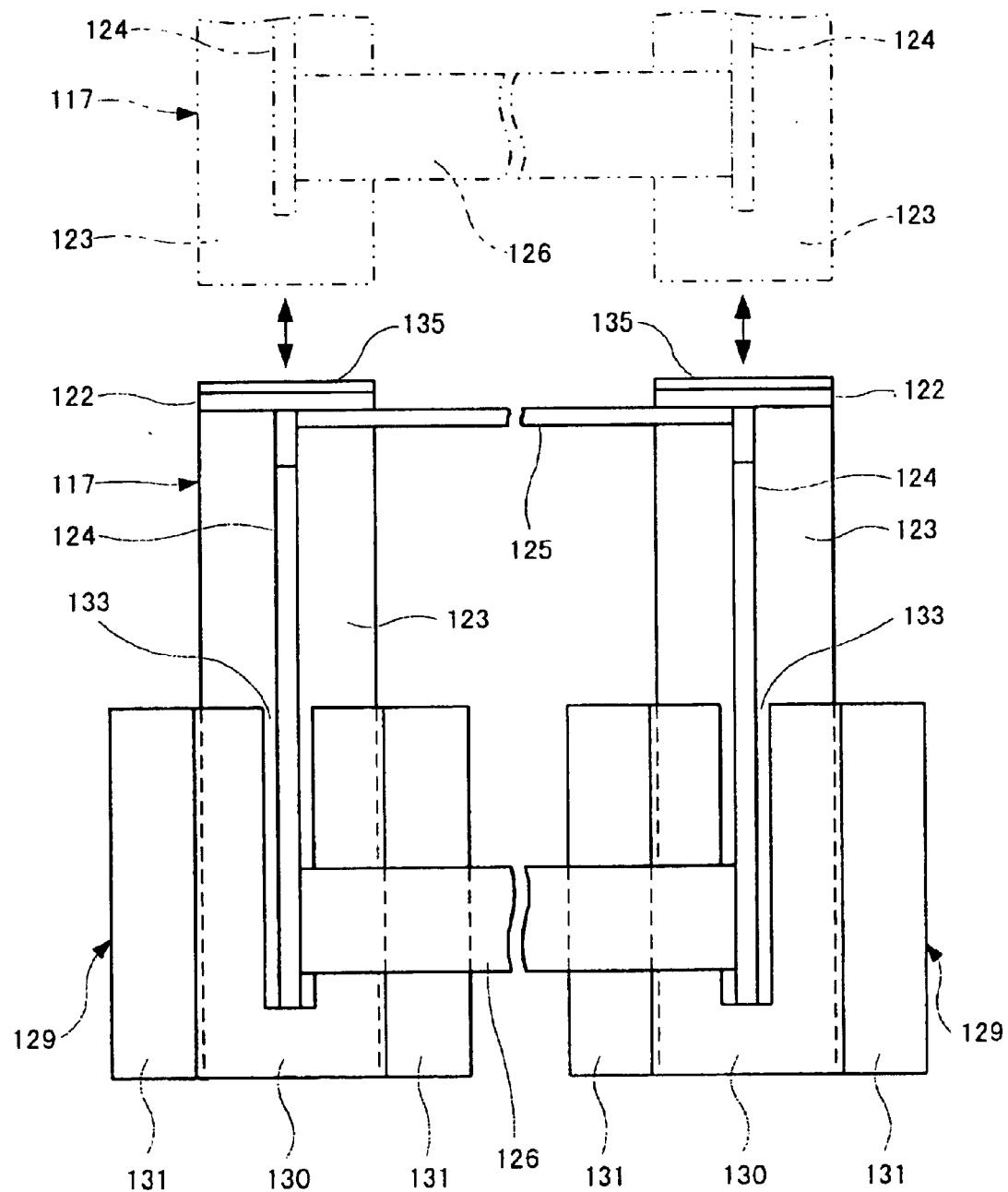
FIG. 27 is a right side view of the mount mounted on the arm rest of the seat of the same industrial vehicle.
Figure 28:
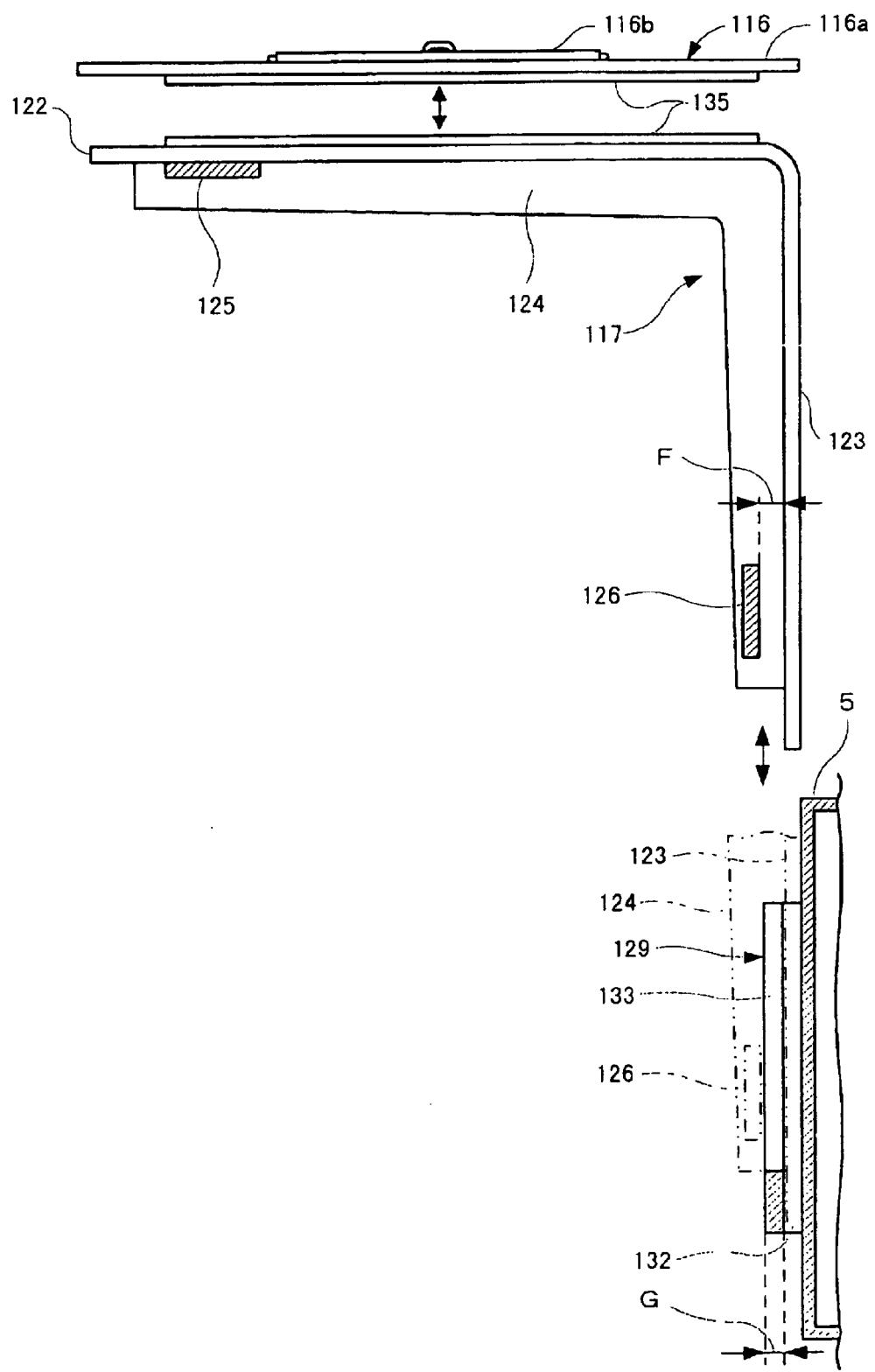
FIG. 28 is a partially cutaway front view of the mount mounted on the arm rest of the seat of the same industrial vehicle.

As shown in FIG. 27 to FIG. 29, lower portions of both the insertion frames 123 of the above-described mount 117 are constructed to be freely inserted into and removed from the insertion hole 132 of both the above-described brackets 129 from above. Lower portions of both the reinforcing plates 124 of the above-described mount 117 are constructed to be freely inserted into and removed from the notches 133 of both the above-described brackets 129 from above. A space F between the insertion frame 123 of the mount 117 and the lower connecting frame 126 is constructed to be a little larger than a thickness G of the middle longitudinal plate 130 of the bracket 129.

Face fasteners 135 (an example of bonding means) attachable to and detachable from each other are attached on a top surface of both the lateral frames 122 of the above-described mount 117 and a back surface of the main body 116a of the above-described binder 116. The above-described face fastener 135 is an attachable and detachable tape using pile.

An operation of the above-described fourth embodiment will be described below.

As shown in FIG. 27 to FIG. 29, the lower portions of both the insertion frames 123 of the mount 117 are inserted into the insertion hole 132 of both the brackets 129 from above, whereby the mount 117 is easily and rapidly mounted on the right side surface of the arm rest 5. In this situation, the lower portions of both the reinforcing plates 124 of the mount 117 are inserted into the notches 133 of both the brackets 129 from above, and the lower ends of both the reinforcing plates 124 abut against bottom surfaces of both the notches 133 from above, whereby an insertion amount of the insertion frame 123 into the insertion hole 132 is restricted.

Figure 26:
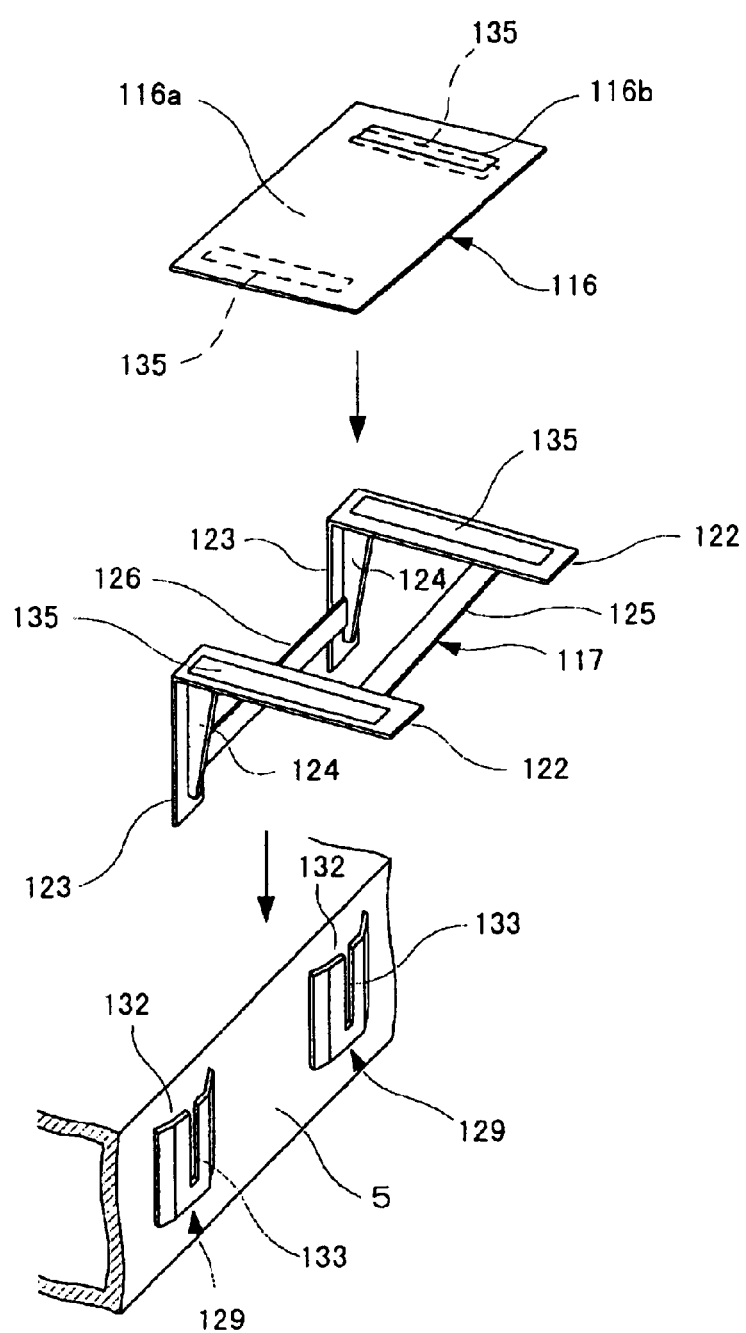
FIG. 26 is a perspective view showing a situation in which a mount is removed from an arm rest of the seat of the same industrial vehicle.

As shown in FIG. 26, the binder 116 is placed on both the lateral frames 122 of the mount 117, whereby the face fastener 135 on the binder 116 and the face fastener 135 on the mount 117 are bonded to each other, and therefore the binder 116 is firmly fixed on the mount 117 and does not fall off the mount 117 during operation.

By holding the document 119 describing a content and procedures of cargo handling work on the binder 116, the operator 146 can work while looking at the document 119 in the state in which he or she sits on the seat 4 as shown in FIG. 9. In this situation, since the mount 117 is provided at the arm rest 5, the binder 116 placed on the mount 117 is located at a right side of the seat 4. Accordingly, since the binder 116 is located near the hand of the operator 146 sitting on the seat 4, the operator 146 can easily attach and detach the document 119 to and from the binder 116 without bending the upper part of his or her body. Since a distance (difference of elevation) between a height of eyes of the operator 146 sitting on the seat 4 and the binder 116 is reduced, the document 119 is easily seen.

When running the fork lift 1 backward, the operator 146 rotates the seat 4 from the forward facing position A to the clockwise rotated position R as shown in FIG. 10. As a result, the operator 146 sitting on the seat 4 becomes comfortable in his or her rear facing posture, and reduction of fatigue and securing of the rear view are facilitated. As shown in FIG. 11, by rotating the seat 4 from the forward facing position A to the counterclockwise rotated position L, the ease with which the operator 146 gets on and off the seat 4 from the left side is increased.

When the seat 4 is rotated to the right and left from the forward facing position A as described above, the mount 117 is also rotated together with the seat 4. Accordingly, even when the operator 146 sits on the seat 4 and rotates the seat 4 to the clockwise rotated position R and the counterclockwise rotated position L from the forward facing position A, the operator 146 can easily see the document 119 held on the binder 116, and attachment and detachment of the document 119 to and from the binder 116 are facilitated.

As shown in FIG. 26, the mount 117 is lifted upward, whereby the lower portions of both the insertion frames 123 are removed upward from both the insertion holes 132, and the lower portions of both the reinforcing plates 124 are removed upward from both the notches 133. As a result, the mount 117 can be easily and rapidly removed from the arm rest 5, and the mount 117 never becomes a hindrance.

In the above-described fourth embodiment, as shown in FIG. 22, the mount 117 is provided at the right side of the seat 4, but it may be provided at a left side.

In the above-described fourth embodiment, as shown in FIG. 26, a pair of front and rear (two) insertion frames 123 of the mount 117 are provided and a pair of front and rear (two) brackets 129 are provided, but one, or three or more of the above-described insertion frames 123 and the same number of the brackets 129 as the above-described frames 123 may be provided.

In the above-described fourth embodiment, the face fastener 135 is used as an example of the bonding means, but a magnetic tape or an adhesive tape may be used.

INDUSTRIAL APPLICABILITY

As described above, the industrial vehicle according to the present invention is suitable for a fork lift and the like in which the seat is constructed to be rotatable to the right and left with respect to the forward facing position.

What is claimed is:
1. An industrial vehicle having a seat placed in a driver's room provided in a vehicle body to be rotatable at a predetermined angle in at least one of a clockwise direction and a counterclockwise direction with respect to a forward facing position, wherein said driver's room comprises a main accelerator pedal at a position corresponding to the seat in the forward facing position and an auxiliary accelerator pedal at a position corresponding to the seat in a position rotated at a predetermined angle from the forward facing position, the main accelerator pedal is constructed to interlock with the auxiliary accelerator pedal via an interlock mechanism, the interlock mechanism comprises a main accelerator link which can be freely rotated by depressing the main accelerator pedal and is returned to an original position by a main return spring, an auxiliary accelerator link which can be rotated by depressing the auxiliary accelerator pedal and is returned to an original position by an auxiliary return spring, and an interlock cable connecting both the accelerator links, rotation of the auxiliary accelerator link is transmitted to the main accelerator link via the interlock cable, and a throttle valve is interlocked with the main accelerator link via a throttle cable.

2. An industrial vehicle having a seat placed in a driver's room provided in a vehicle body to be rotatable at a predetermined angle in at least one of a clockwise direction and a counterclockwise direction with respect to a forward facing position, wherein said driver's room comprises a main accelerator pedal at a position corresponding to the seat in the forward facing position and an auxiliary accelerator pedal at a position corresponding to the seat in a position rotated at a predetermined angle from the forward facing position, an interlock mechanism is provided between the main accelerator pedal and the auxiliary accelerator pedal, the interlock mechanism comprises a main accelerator link which can be freely rotated by depressing the main accelerator pedal and is returned to an original position by a main return spring, an auxiliary accelerator link which can be freely rotated by depressing the auxiliary accelerator pedal and is returned to an original position by an auxiliary return spring, first and second rotatable intermediate links, and an interlock cable connecting the auxiliary accelerator link and the second intermediate link, the main accelerator link has a main engaging member which engages with the first intermediate link when rotating in one direction, the second intermediate link has an intermediate engaging member which engages with the first intermediate link when rotating in one direction, the intermediate engaging member is separable from the first intermediate link when said main engaging member engages the first intermediate link, and the main engaging member is separable from the first intermediate link when the intermediate engaging member engages the first intermediate link, rotation of the auxiliary accelerator link is transmitted to the second intermediate link via the interlock cable, and a throttle valve is interlocked with the first intermediate link via a throttle cable.

* * * * *